United States Patent
Chan et al.

(10) Patent No.: US 8,215,848 B1
(45) Date of Patent: Jul. 10, 2012

(54) METHODS AND APPARATUS FOR MAKING CONNECTIONS BETWEEN OPTICAL FIBERS AND OPTICAL COMPONENTS

(75) Inventors: Eric Yuen-Jun Chan, Mercer Island, WA (US); Alex A. Kazemi, Altadena, CA (US); Dennis G. Koshniz, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 448 days.

(21) Appl. No.: 12/464,585

(22) Filed: May 12, 2009

(51) Int. Cl.
*G02B 6/36* (2006.01)
*G02B 6/42* (2006.01)

(52) U.S. Cl. .............. 385/91; 385/88; 385/92; 385/94

(58) Field of Classification Search .............. None
See application file for complete search history.

(56) References Cited

U.S. PATENT DOCUMENTS

| | | | | |
|---|---|---|---|---|
| 5,727,105 | A * | 3/1998 | Nagata et al. | 385/94 |
| 6,997,621 | B2 * | 2/2006 | Saitou et al. | 385/91 |
| 2003/0152356 | A1 * | 8/2003 | Fritz et al. | 385/138 |
| 2004/0264889 | A1 * | 12/2004 | Lake | 385/92 |

OTHER PUBLICATIONS

Bhandakar, S.M.; Solder, Solder Fluxes, and Solder Pastes; Soldering Processes and Equipment; 1993; pp. 9-45; John Wiley & Sons, Inc. New York.
Keranen, K. et al.; Hermetic Fiber Pigtailed Laser Module Utilizing Passive Device Alignment on an LTCC Substrate; IEEE Transaction on Advanced packaging; Feb. 2009; pp. 223-227; vol. 32, No. 1.
Evrard, M. et al.; Hermetic Fiber Optic Connectors and Feedthrus; IEEE; 2008; pp. 23-24.

* cited by examiner

*Primary Examiner* — Michelle R Connelly
(74) *Attorney, Agent, or Firm* — Armstrong Teasdale LLP

(57) ABSTRACT

A method for providing an improved interconnection between an optical fiber and an optical package is described. The method includes inserting an end of the fiber through a feed through tube and into a main body of the optical package, a portion of the fiber proximate the end being metalized, attaching the metalized portion of the fiber within the main body of the optical package, a portion of the metalized fiber remaining within the feed through tube, inserting a stopping device into the feed through tube, melting solder within the feed through tube, in an area between the stopping device and the main body of the optical device, the area containing metalized fiber, compressing the melted solder using the stopping device, removing the stopping device from the feed through tube after the solder has solidified, and attaching a jacket associated with the optical fiber within the feed through tube.

21 Claims, 31 Drawing Sheets

METHODS AND APPARATUS FOR MAKING CONNECTIONS BETWEEN OPTICAL FIBERS AND OPTICAL COMPONENTS

STATEMENT REGARDING FEDERALLY SPONSORED RESEARCH & DEVELOPMENT

The U.S. Government has certain rights in this disclosure as provided for by the terms of Contract No. HQ0006-01-C-0001.

BACKGROUND

The field of the invention relates generally to optical fiber soldering, and more specifically, to methods and apparatus for making micro-soldered connections between optical fibers and optical components.

In certain laser diode applications, failures are often due to the broken optical fibers attached to the laser diode package, for example, a mini-dil (dual-in-line) laser diode package. During end use, solder voids and weak fiber sections can cause the optical fiber to break.

Currently, metalized fiber is soldered all the way to the end of a feed through tube (sometimes referred to as a snout) of the mini-dil laser diode package. Generally this soldering is done with an alloy of indium and tin (In 52% and Sn 48%). This alloy is sometimes referred to as In52Sn48 solder. In the soldering process, a fiber jacket for the optical fiber is placed at a distance of about five millimeters from the feed through tube, and a fiber boot is attached to both the fiber jacket and the feed through tube by epoxy. In this configuration, the fiber boot is the only strain relief for the exposed five millimeter region of the unjacketed optical fiber.

This configuration has certain problems associated therewith. For example, using In52Sn48 solder may result in voids inside the feed through tube, because In52Sn48 solder is a low melting point (about 118 degrees Celsius) soft solder which is prone to formation of voids. To prepare the end product, the In52 Sn48 solder is applied to the end of a window inside of the feed through tube, which is subsequently filled with unsoldered In52Sn48 to the end of the feed through tube. The fiber jacket, which is the main protection of the fragile glass fiber, is located five millimeters outside the feed through tube. The glass fiber is unprotected across this five millimeter distance.

As the fiber assembly gets handled during construction of the end device, the optical fiber within this five millimeter section is prone to breakage. More specifically, during a production process, these assemblies associated with the laser diodes and optical fibers are moved around when assembled into the end package. In addition, a foam excavation process also causes movement of the "unprotected" fiber within the assembly. As a result of the broken optical fibers within laser diode packages, certain end product yields are less than 50%.

By filling the entire feed through tube with solder, extra stress is exerted on the fiber because there is a large mismatch in the coefficient of thermal expansion (CTE) between the glass fiber and the metal solder. Since the primary function of the solder is to form a hermetic seal for the mini-dil package, it is not required to have the solder fill the entire feed through tube. An alternative design should consider using less solder to form the hermetic seal between the glass optical fiber and the laser diode package.

In addition, the fiber boot used in the current process may loosen over time. One cause is epoxy degradation and failure during an installation process. As a result, the unjacketed region of the optical fiber outside the feed through tube breaks easily because any support and strain relief provided by the boot extending between the jacketed fiber and the feed through tube is no longer available when the boot loosens.

SUMMARY

In one aspect, a method for providing an improved interconnection between an optical fiber and an optical package, where the optical package includes a feed through tube extending from a main body is provided. The main body is configured to contain at least one optical component. The method includes inserting an end of the fiber through the feed through tube and into the main body of the optical package, a portion of the fiber proximate the end being metalized, attaching the metalized portion of the fiber proximate an optical component within the main body of the optical package, a portion of the metalized fiber remaining within the feed through tube, inserting a stopping device into the feed through tube, melting solder within the feed through tube, in an area between the stopping device and the main body of the optical device, the area containing metalized fiber, compressing the melted solder using the stopping device, removing the stopping device from the feed through tube after the solder has solidified, and attaching a jacket associated with the optical fiber within the feed through tube.

In another aspect, an optical device is provided. The optical device includes an optical fiber comprising a first end having a length, the length comprising a metalized portion of the optical fiber, an optical fiber jacket, a main body for placement of an optical component therein, and a hollow feed through tube extending from said main body, said hollow fed through tube comprising a window formed in a side thereof. The first section of the metalized portion extends through the feed through tube and into the main body, the second section of the metalized portion is soldered within the feed through tube, between the window and the main body. The optical fiber jacket is placed over the optical fiber, an end portion of the optical fiber jacket within the feed through tube, the end portion maintained within the feed through tube via application of an adhesive through the window.

In still another aspect, a method for providing strain relief to an optical fiber connected to an optical device is provided. The method includes soldering a metalized portion of the fiber within a feed through tube, the feed through tube extending from the optical device, sliding a portion of an optical fiber jacket into the feed through tube, and applying an adhesive through a window formed in a side of the feed through tube to bond the optical fiber jacket to an inside of the feed through tube.

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein relate to a reliable optical fiber soldering and ruggedizing technique. Generally, the embodiments relate to an end of an optical conductor (fiber) that has been processed for attachment to a package that houses components which are to interface with the optical conductor. In one practical application, the embodiments are utilized to provide optical connections within packages such as mini-dil (dual-in-line) laser diode packages. It should be understood that the embodiments described herein are not limited to mini-dil packages, and further understood that the description and figures that utilize mini-dil packages and end use packages are intended as example illustrations only.

Figure 1:
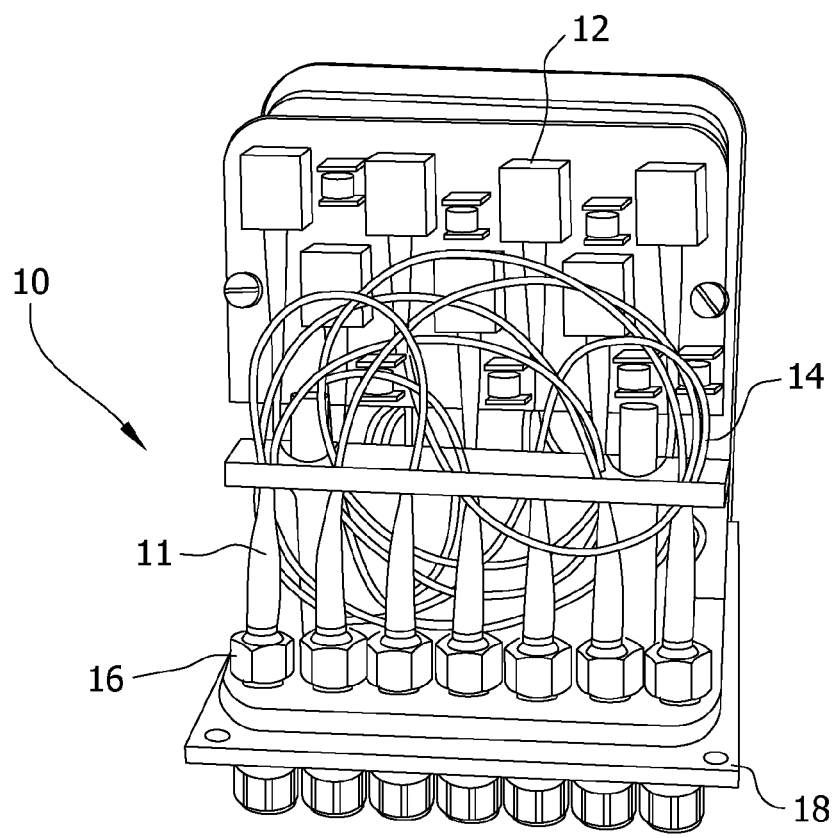
FIG. 1 is an illustration of a laser unit that includes multiple individual laser diode assemblies.

More specifically, the embodiments relate to a low cost technique to perform fiber soldering and strain relief of the type that may be utilized, for example, with a laser diode mini-dil package of the type shown in FIG. 1. This process is compatible with standard fiber optic device manufacturing processes, while producing an optical fiber package, or assembly, that is robust, rugged and reliable. Referring specifically to FIG. 1, one embodiment of a laser unit 10 is illustrated that includes 14 individual laser diode assemblies 11 that include at least one laser diode that is packaged in mini-dil (dual-in-line) fiber optic packages 12.

In operation, the laser unit 10 includes individual laser diodes that are "turned on" at an appropriate time. Each laser diode emits high optical pulse power. The optical emissions may cause various functions to occur. Outputs from the individual laser diodes are provided, at least in the illustrated embodiment, via fiber optic cables 14 which extend between the fiber optic packages 12 and SMA (Sub-Miniature version A) connectors 16 which are mounted to a chassis 18.

Figure 2:
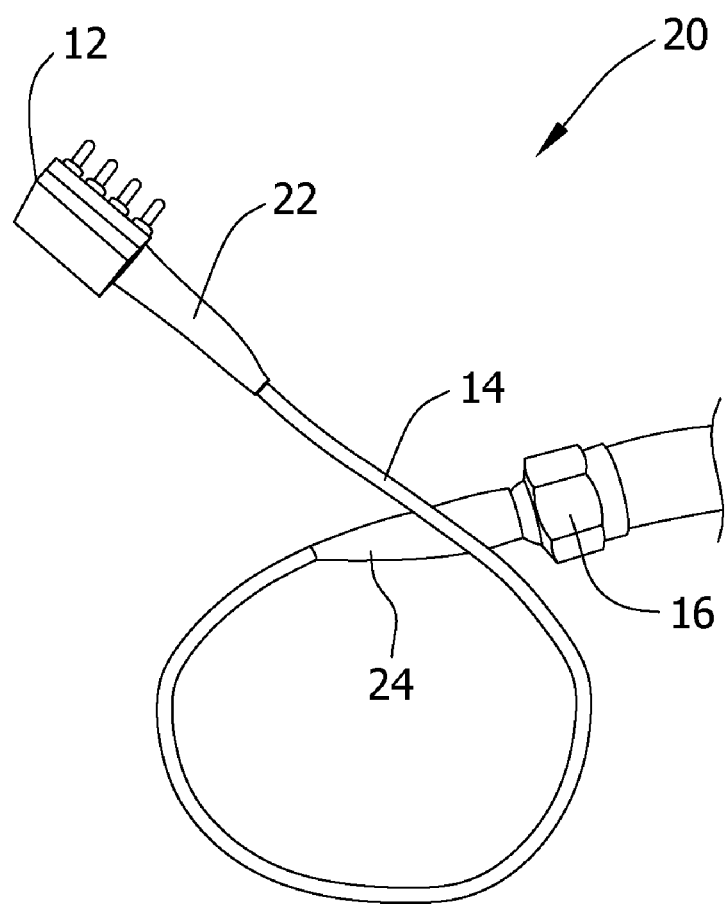
FIG. 2 is a diagram of the components related to an individual laser diode assembly.

FIG. 2 is a diagram of the components related to an individual laser diode assembly 20. Assembly 20 includes the fiber optic package 12, the SMA connector 16 and the fiber optic cable 14 running therebetween. Assembly 20 also includes strain relief boots 22 and 24. Boot 22 provides strain relief for the interconnection between the fiber optic cable 14 and the fiber optic package 12. Boot 24 provides a strain relief function for the interconnection between the fiber optic cable 14 and the SMA connector 16.

Most of the fiber optic cable 14 is covered by a jacket, which is much like wire insulation in function in that the jacket operates to protect the fiber from external forces and the outside environment. However, and as described above, a section of the fiber, within the boot 22, is unprotected by the jacket such that a connection to fiber optic package 12 can be made. The unprotected length of glass fiber is easily broken due to its being unsupported and unprotected. Such breakage generally occurs when the portion of the fiber extending into boot 22 is moved during assembly of the laser unit.

Figure 3:
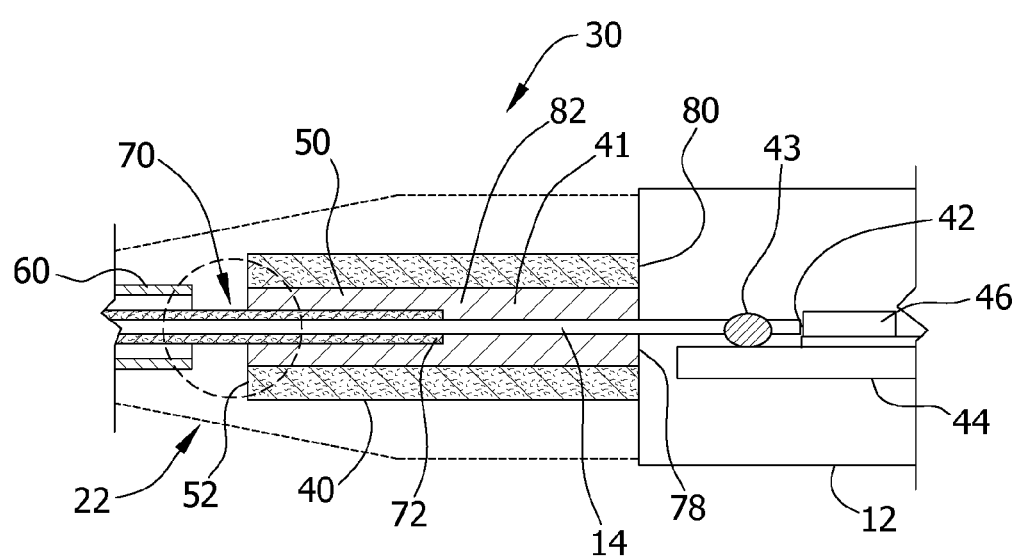
FIG. 3 is a cross-sectional view of an interconnection between a laser diode and an optical fiber.

FIG. 3 is a cross-sectional view of one known embodiment of an interconnection between a laser diode and an optical fiber. This interconnection area 30 is protected by the boot 22. The fiber optic package 12 includes a fiber feed through tube 40 (which is sometimes referred to as a snout) extending therefrom. An end 42 of the fiber 14 is passed through the hollowed area 41 of the feed through tube 40 and is soldered, using solder 43, onto an alumina substrate 44 so that the end 42 is aligned in close proximity to a laser die 46 for maximizing the coupling of laser output power into the fiber. In one embodiment, fiber 14 is metalized and the metalized fiber 14 is soldered within hollowed area 41 (using solder 50) all the way to an end 52 of the feed through tube 40 of the laser diode package 12. One solder type is an alloy of indium and tin. The fiber jacket 60 is attached to a portion of fiber 14 such that jacket 60 terminates, in the example embodiment, about five millimeters from the end 52 of the fiber feed through tube 40. While this area 70 of fiber 14 may include a coating 72, the coating 72 is not formulated to provide robust strain relief or mechanical protection to the fiber 14.

The fiber boot 22 is attached to both the fiber jacket 60 and the fiber feed through tube 40, for example, using an adhesive such as an epoxy. As such, the fiber boot 22 is the only strain relief for the exposed area 70 of the unjacketed optical fiber 14. As mentioned above, as the fiber assembly gets moved, which occurs in an assembly process, the fiber 14 breaks easily in the exposed area 70.

Other problems exist in the arrangement illustrated in FIG. 3. Particular solder formulations, for example In52Sn48 solder, is prone to causing voids inside the feed through tube 40 because the In52Sn48 solder is a low melting point, soft solder and therefore prone to formation of voids. In addition, this solder is soldered at an opening 78 at a second end 80 of feed through tube 40, and the tube 40 is then filled with unsoldered solder 82 to the first end 52 of tube 40. By filling the entire feed through tube 40 with solder 82, it causes extra stress on the fiber 14 because there is a large mismatch in coefficient of thermal expansion (CTE) between the glass fiber 14 and the metal solder 82. Since the primary function of the solder 82 is to form a hermetic seal for the fiber optic package 12, it is not required to have the solder 82 fill the tube 40 all the way to end 52.

Finally, the fiber boot 22 currently utilized becomes loose fitting over time, in part because the epoxy utilized to attach boot 22 degrades or is stressed during subsequent laser unit 10 installation processes. Over time, one result of this degradation is equivalent to the epoxy failing to attach the jacketed fiber to the feed through tube 40. The unjacketed region (exposed area 70) of the fiber 14 is prone to breaking because the support and strain relief for the portion of the fiber 14 (exposed area 70) within the boot 22 is no longer provided when the boot 22 is loose.

Figure 4:
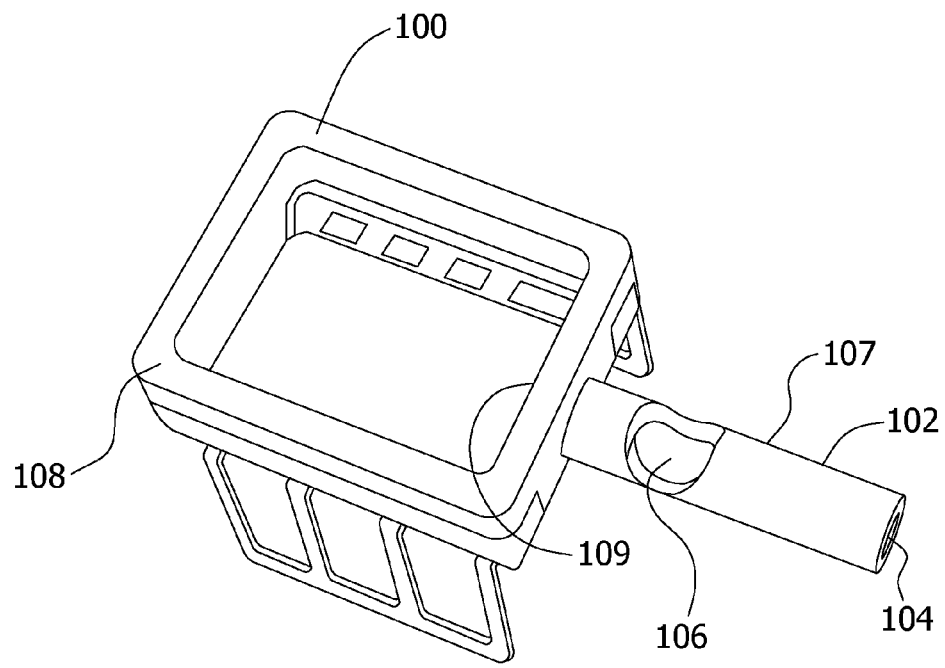
FIG. 4 is an illustration of a mini dual-in-line laser package.

FIG. 4 is an illustration of a mini-dil package 100 which is utilized in addressing the problems described above. As is further explained with respect to subsequent figures, package 100 is utilized in conjunction with a process that allows for a reduction in the solder volume needed to hermetically seal the package 100. Package 100 also includes a feed through tube 102, or snout, which has a relatively large diameter bore 104 similar to the hollowed area 41 in feed through tube 40 (shown in FIG. 3). The described embodiments illustrate methods which overcome the challenges associated with utilizing a large bore package with relatively smaller diameter optical fiber. Specifically, a window 106 is formed in a side 107 of the feed through tube 102, the function of which is described in the following paragraphs. Package 100 further includes a main body 108 from which the feed through tube 102 extends. The interface between the feed through tube 102 and the main body 108 includes an opening 109 through which an optical fiber will extend.

The larger diameter bore 104 makes it difficult to control the solder flow inside the feed through tube 102. The processes described with respect to the following figures illustrate a method for confining the solder to a small region inside the feed through tube 102 to hermetically seal package 100. These processes do not effect laser diode alignment and laser chip assembly processes within package 100.

Figure 5:
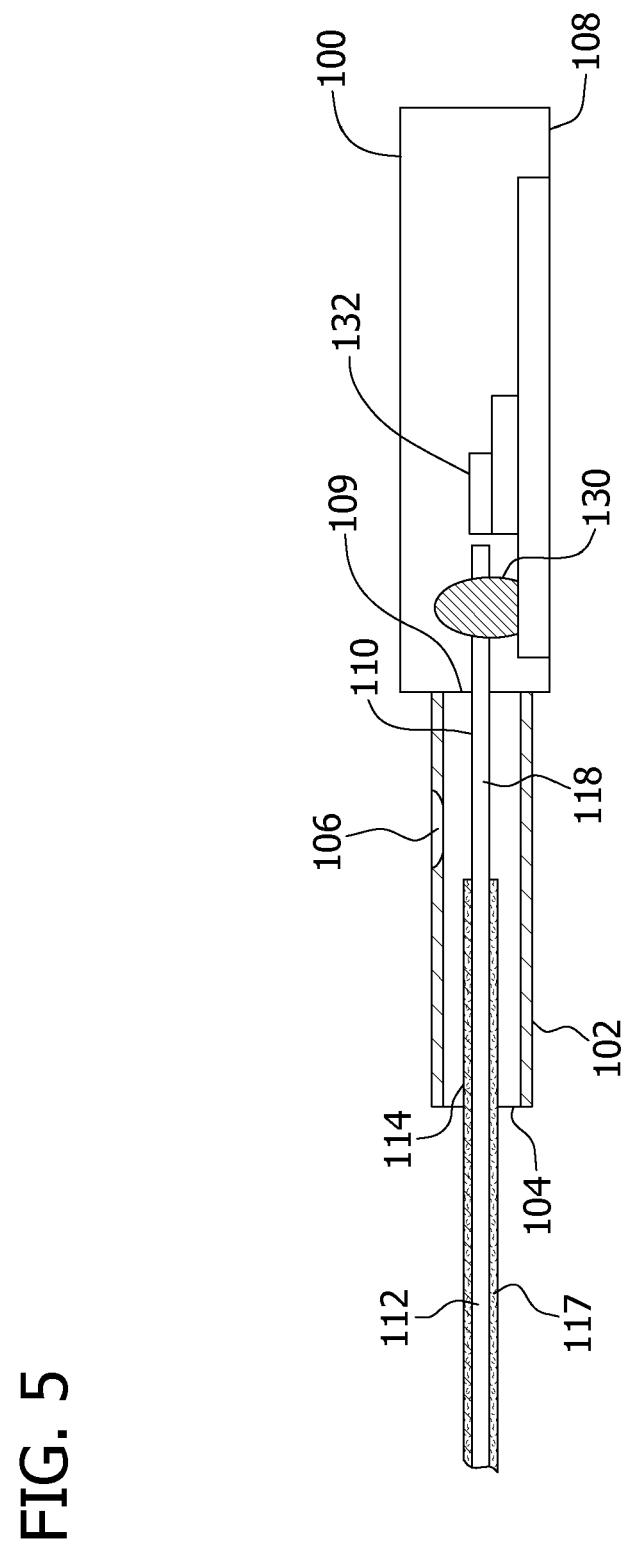
FIG. 5 illustrates the soldering of a metalized portion of an optical fiber proximate a laser diode within the package shown in FIG. 4.

FIG. 5 illustrates a portion of a process for soldering a metalized portion 110 of fiber 112 to the package 100 while also attaching a coated portion 114 of fiber 112 within package 100. The metalized portion 110 of fiber 112 is coated with a metallic substance (e.g. layers of nickel and gold) and is sometimes referred to as a metalized fiber 118. The coating 117 is a polymer coating which is not metallic. Referring again to FIG. 5, the metalized fiber 118 is inserted into the feed through tube 102, aligned with the laser diode 132, and locked with solder 130 at an optimized position, for example.

Figure 6:
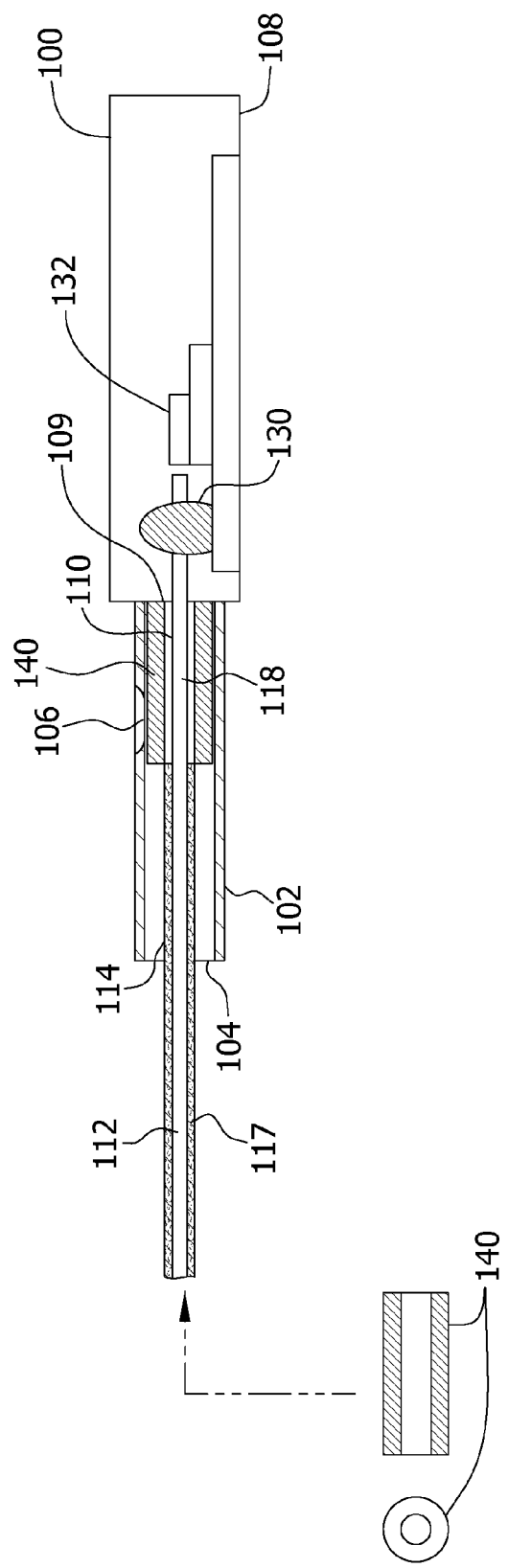
FIG. 6 illustrates a tubular solder preform slid over the coating of the fiber shown in FIG. 5 and inserted into a feed through tube of the package shown in FIG. 4.
Figure 7:
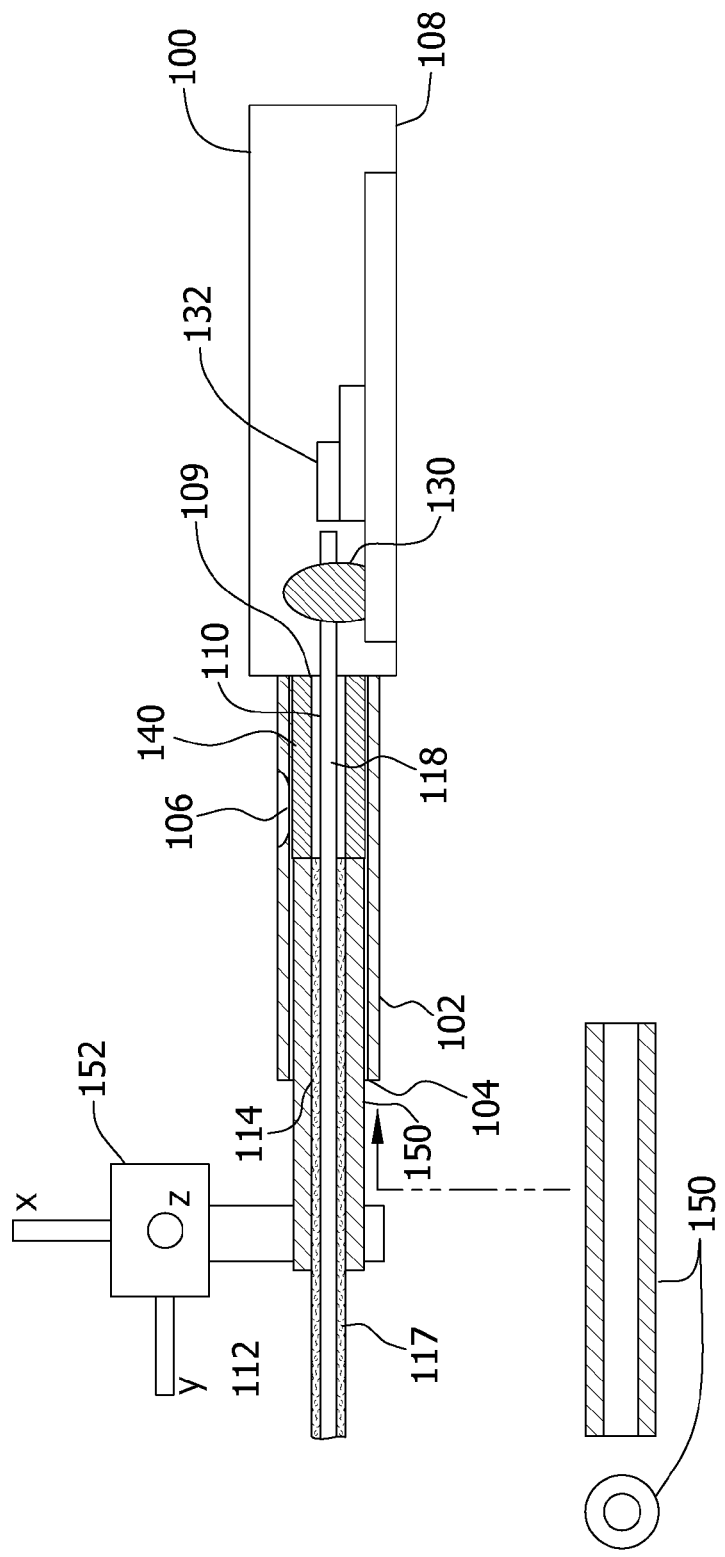
FIG. 7 illustrates the insertion of a quartz tube into the feed through tube and adjacent the solder preform shown in FIG. 6.

Now referring to FIG. 6, a tube shaped solder preform 140 is inserted into the feed through tube 102 as shown. FIG. 7 illustrates the mounting of a stopping device such as a quartz tube 150 on an x, y, z micro-manipulator 152. The quartz tube 150 is slid over the coating 117 and the micro manipulator 152 is used to insert the quartz tube 150 into the feed through tube 102 until it reaches solder preform 140 as shown in FIG. 7. It should be noted that the quartz tube is placed such that at least a portion of the coating 117 is within the quartz tube 150 and also the feed through tube 102. Various embodiments of solder preform 140 and quartz tube 150 are described below.

Figure 8:
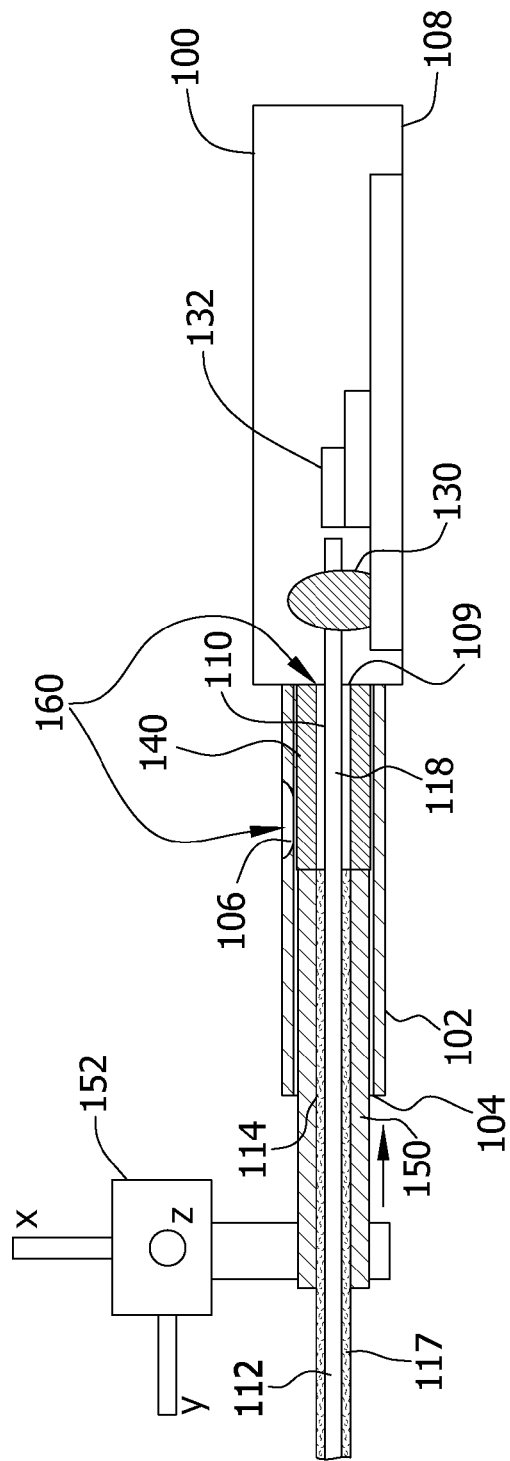
FIG. 8 illustrates application of solder flux to the solder preform through a window and opening associated with the feed through tube of the package shown in FIG. 4.
Figure 9:
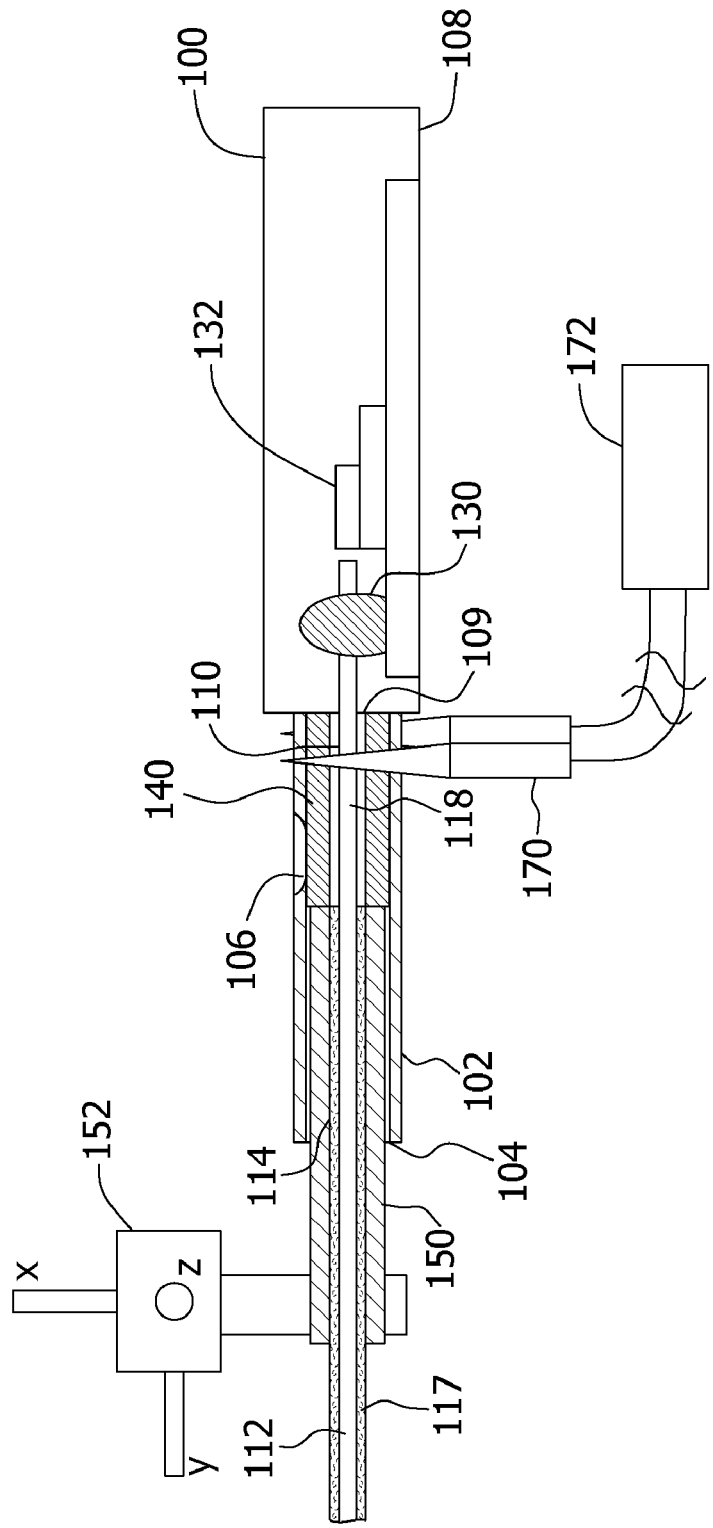
FIG. 9 illustrates a heating device positioned to clamp on to the feed through tube of the package shown in FIG. 4.
Figure 10:
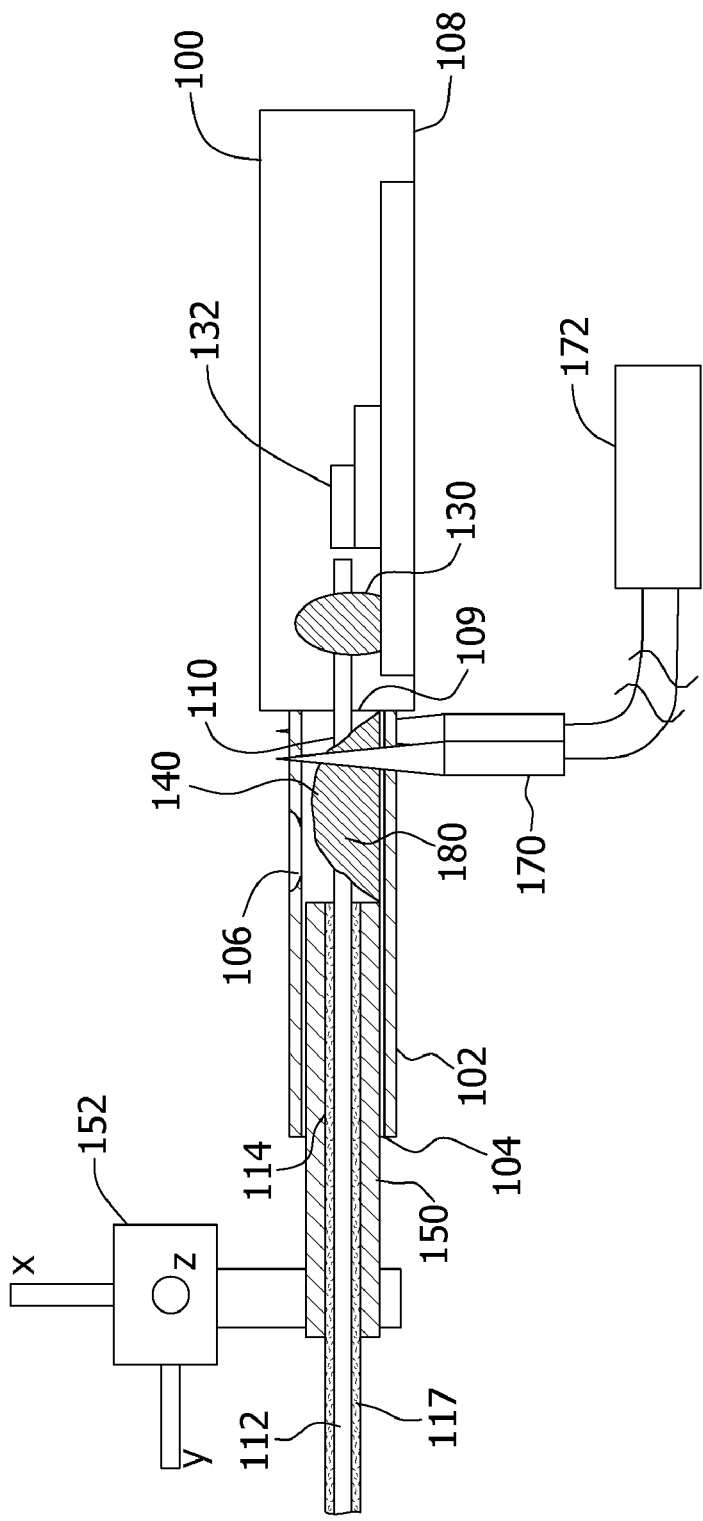
FIG. 10 illustrates reflow of the solder preform due to heat applied by the heating device of FIG. 9.

Now referring to FIG. 8, a small amount of solder flux 160 may be applied to solder preform 140 through window 106 and opening 109. FIG. 9 shows a heating device, such as micro-tweezers 170 that are positioned to clamp on to the outside of feed through tube 102. Micro-tweezers 170 are operable to apply heat to feed through tube 102, for example, by activation of a foot switch 172. When heat is applied to the feed through tube 102 through micro-tweezers 170, it causes a reflow of solder preform 140, which is illustrated in FIG. 10 by the changed shape of solder preform 140. For purposes of this disclosure, solder preform 140, upon reflow (melting), is subsequently referred to as solder 180.

Solder 180 (and thus solder preform 140), in one embodiment, is made from an alloy of lead and tin (Pb37% and Sn63%). Pb37Sn63 solder reflows at about 185 degrees Celsius. Other alloy compositions which operate as a solder, with different reflow temperatures, can also be utilized. Referring again to FIG. 10, when solder 180 reflows, it spreads in the region between quartz tube 150 and the main body 108 of package 100.

Figure 11:
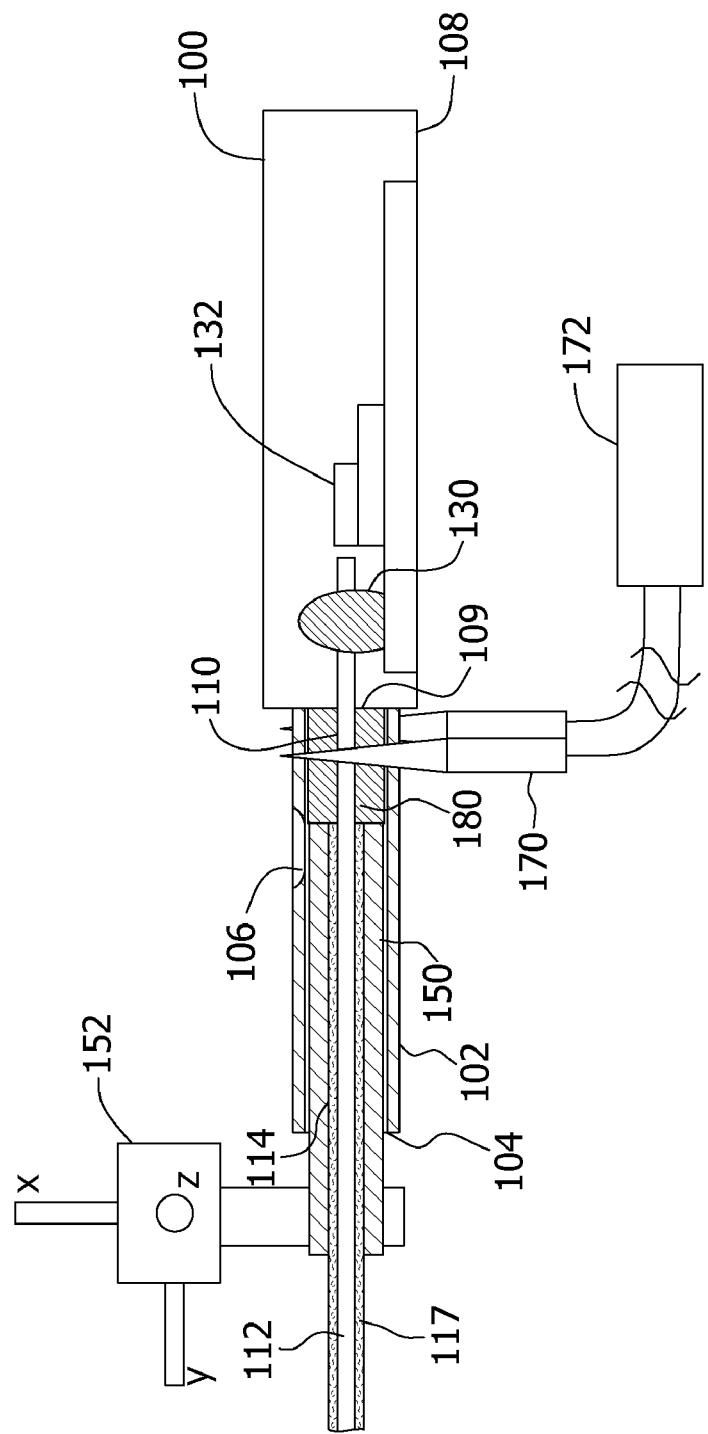
FIG. 11 illustrates compression of the molten solder using the quartz tube shown in FIG. 7.

The process continues as illustrated in FIG. 11. While solder 180 is melted, the quartz tube 150 is gently pushed towards the main body 108 of package 100 using the micro-manipulator 152, and thus forward to the melted solder 180, until the molten solder 180 reaches the interface (opening 109) between the feed through tube 102 and the main body 108. The molten solder 180 is compressed between the quartz tube 150 and the interface between the feed through tube 102 and the main body 108. The micro-tweezers 170 are then released from the feed through tube 102 and the molten solder 180 is allowed to cool down. When the solder 180 cools and solidifies, it forms a good hermetic seal for package 100 and the solidified solder 180 is well confined to the region between the window 106 and the interface between the feed through tube 102 and the main body 108. In one embodiment, the time between the melting of solder preform 140 to the time solder 180 solidifies is about twenty seconds. Because quartz tube 150 is made of quartz, it has melting temperature about 1670 degrees Celsius and therefore is not affected by the heat from the micro-tweezers 170.

Figure 12:
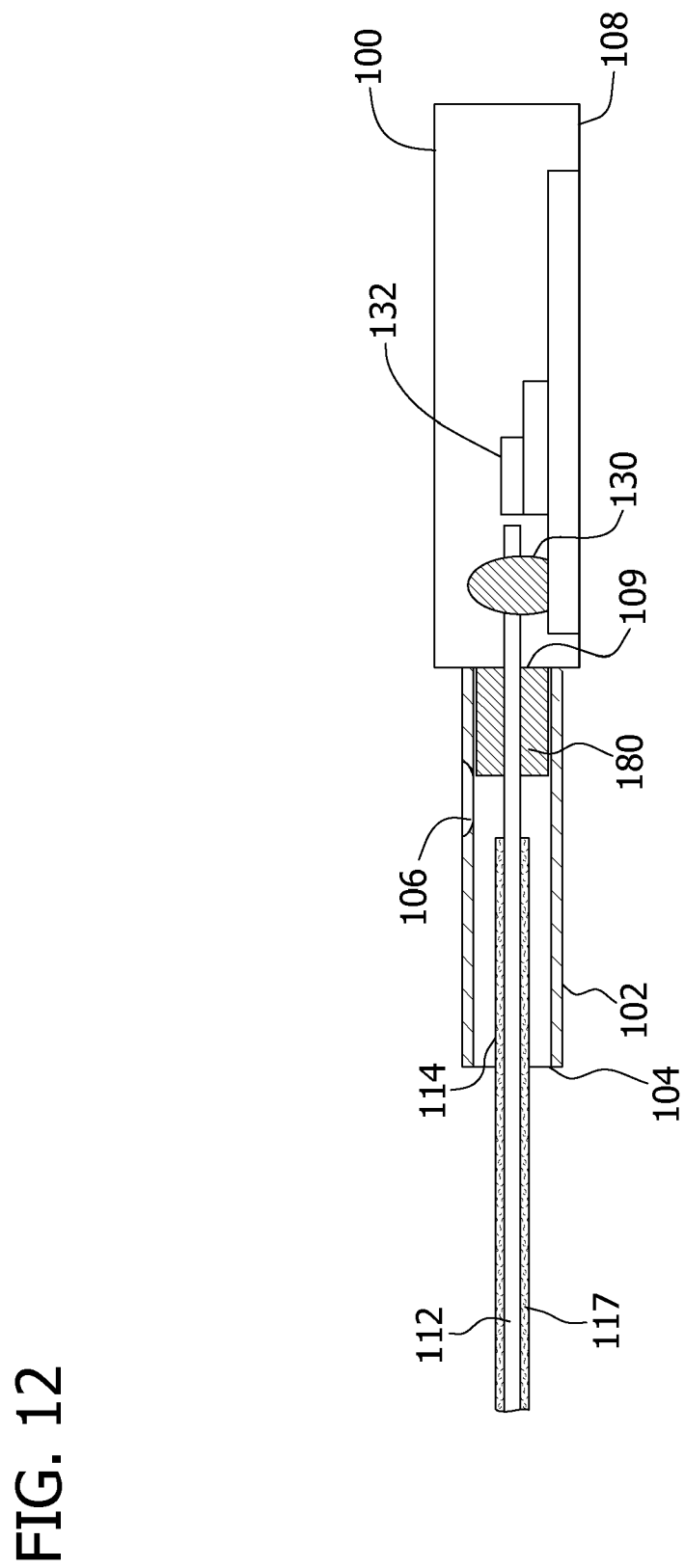
FIG. 12 illustrates removal of the heating device and the quartz tube from the feed through tube after the solder is solidified.
Figure 13:
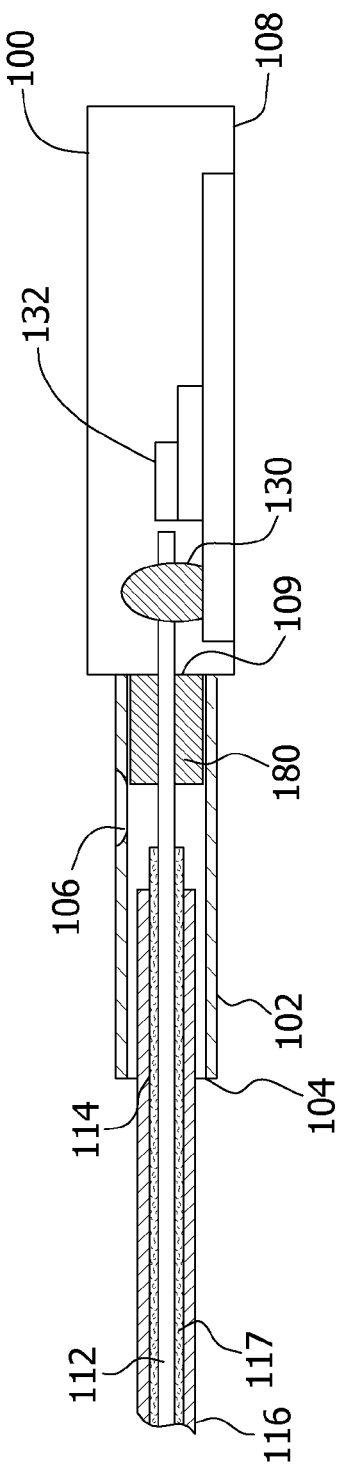
FIG. 13 illustrates sliding a fiber jacket along the fiber coating associated with the optical fiber of FIG. 5 such that a portion of the fiber jacket is inserted into the feed through tube.
Figure 14:
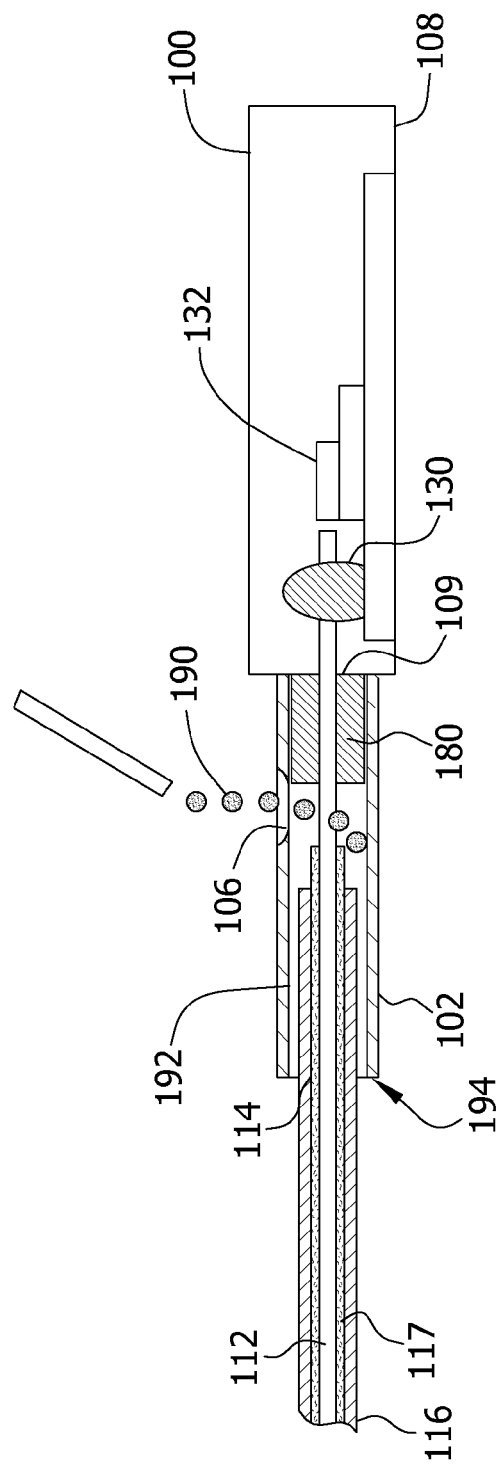
FIG. 14 illustrates application of epoxy into the feed through tube through the window shown in FIG. 8.

As shown in FIG. 12, after the solder 180 is solidified, the micro-tweezers 170 are removed, and the micro-manipulator 152 is utilized to remove the quartz tube 150 from the feed through tube 102. FIG. 13 illustrates that the next step in the process involves sliding of a fiber jacket 116 along fiber 114 (with fiber coating 117) such that a portion of the fiber jacket 116 is inserted into the feed through tube 102. As shown in FIG. 14, the solder reflow process results in an absence of material adjacent to window 106. An epoxy, for example, a space grade epoxy 190, can be applied into the feed through tube 102 through window 106 such that an end result is as much of the free space between fiber jacket 116 and soldered 180 is filled with the epoxy 190. One example of such an epoxy is Epotek 353ND epoxy. Other adhesives may be utilized in place of epoxy 190.

Figure 15:
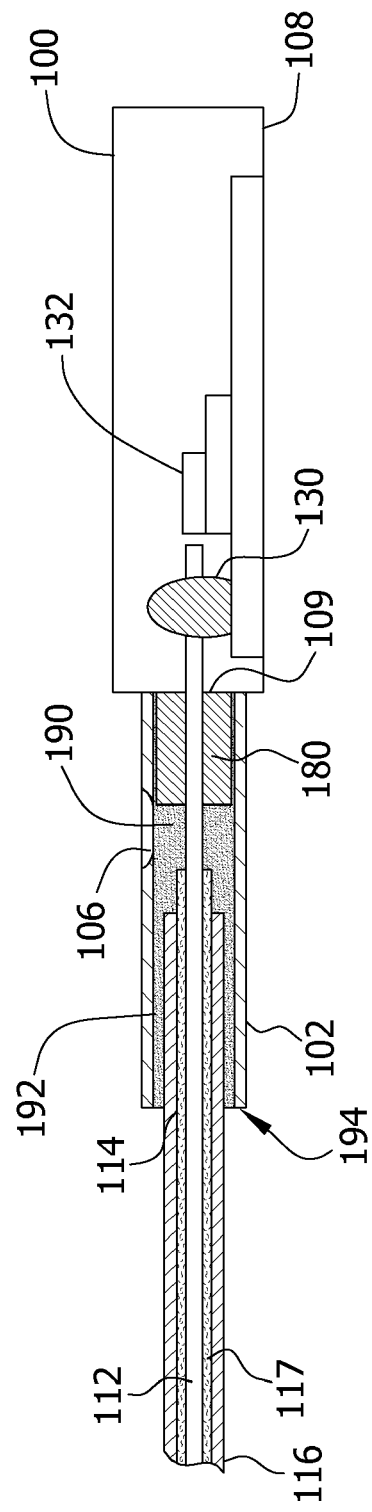
FIG. 15 illustrates heat curing of the epoxy shown being applied into the feed through tube in FIG. 14.

In one specific embodiment, before the epoxy 190 is applied through the window 106, it is heated to about 45 degrees Celsius to remove any air bubbles that might cause voids in the cured epoxy. Such air bubbles could subject the embedded fiber 112 to an increased risk of damage due to temperature or pressure changes. Pre heating the epoxy 190 also thickens the epoxy 190 thereby preventing the epoxy 190 from any capillary effects that might result in only a partial filling of the area 192 along the outside diameter of the loose tube jacket 116 with excess epoxy 190 that would otherwise extend beyond the end 194 of the feed through tube 102. FIG. 15 illustrates that the epoxy 190 has been heat cured, for example at 80 degrees Celsius for about a half an hour. When the epoxy 190 is fully cured, the fiber jacket 116 is securely attached inside the feed through tube 102.

Figure 16:
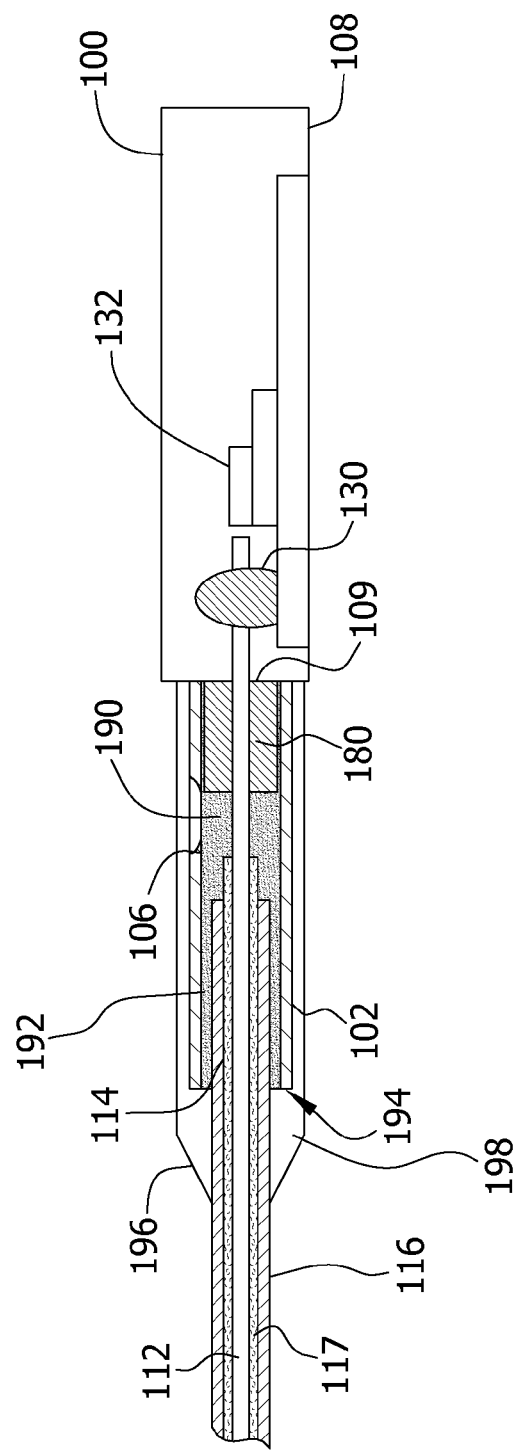
FIG. 16 illustrates application of a fiber boot over the fiber jacket and attached to the exterior of the feed through tube of the package shown in FIG. 4.

Now referring to FIG. 16, a fiber boot 196 is inserted over the fiber jacket 116 and attached to the exterior of the feed through tube 102 utilizing an epoxy 198 or other adhesive. The fiber boot 196 provides additional strain relief to the jacketed fiber 112, it also functions as a bend radius limiter to prevent damage of the jacketed fiber due to excessive bending of the fiber during installation into a chassis, such as chassis 18 shown in FIG. 1. When the above described process is completed, there is no unprotected fiber region outside the feed through tube 102 of the package 100, which is a notable improvement over current fiber assembly construction.

FIGS. 5-16 relate to embodiments of fabricating fiber optic assemblies that include feed through tubes 102 that are oriented substantially horizontal during fabrication. FIGS. 17-22 relate to fabrication of the same assembly. However, and referring to package 200 in FIG. 17, the feed through tube 202 is oriented in a substantially vertical position during fabrication. Two advantages of fiber soldering vertically are that the reflow of the solder inside the feed through tube 202 can be visualized easily with a microscope and, taking advantage of the gravity, the reflowed solder spreads more uniformly inside the feed through tube 102, providing a finer control on the solder seal to the package 100.

Figure 17:
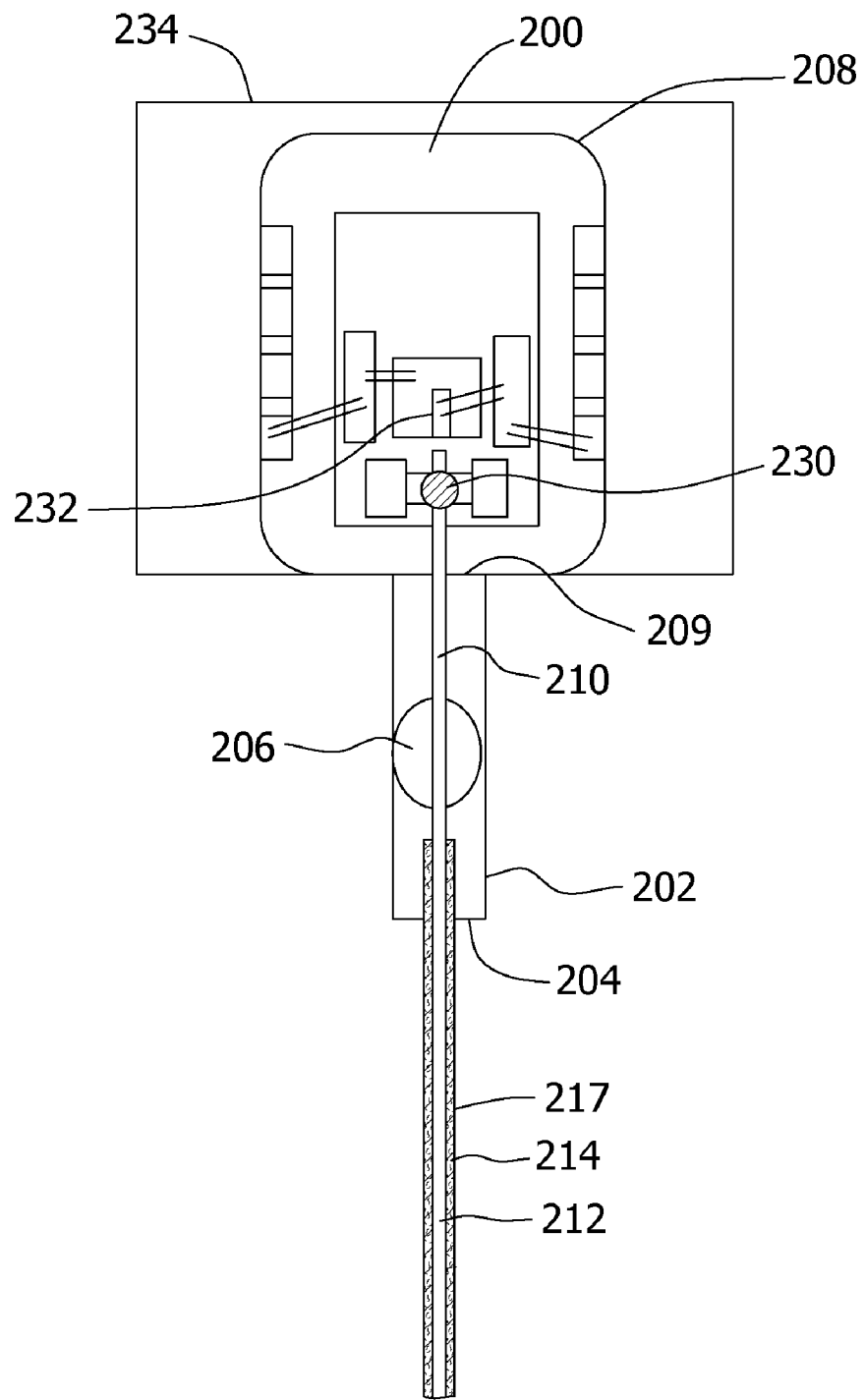
FIG. 17 illustrates a vertically oriented laser diode package and attachment of an optical fiber thereto.

Referring specifically now to FIG. 17, the laser diode package 200 includes the vertically oriented feed through tube 202 through which a metalized portion 210 of fiber 212 passes through. Package 200 includes the same components as package 100. For purposes of clarity, package 200 includes the bore 204, the window 206, the main body 208, and the interface between the feed through tube 202 and the main body 208 that includes an opening 209 through which an optical fiber 212 will extend. Optical fiber 212 includes the metalized portion 210 and the coated portion 214 which includes the coating 217. The metalized portion 210 is attached with solder 230 proximate the laser diode 232. The package 200 is mounted vertically to a fixture 234 which holds the package 200 with fiber 212 in a stable and workable position.

Figure 18:
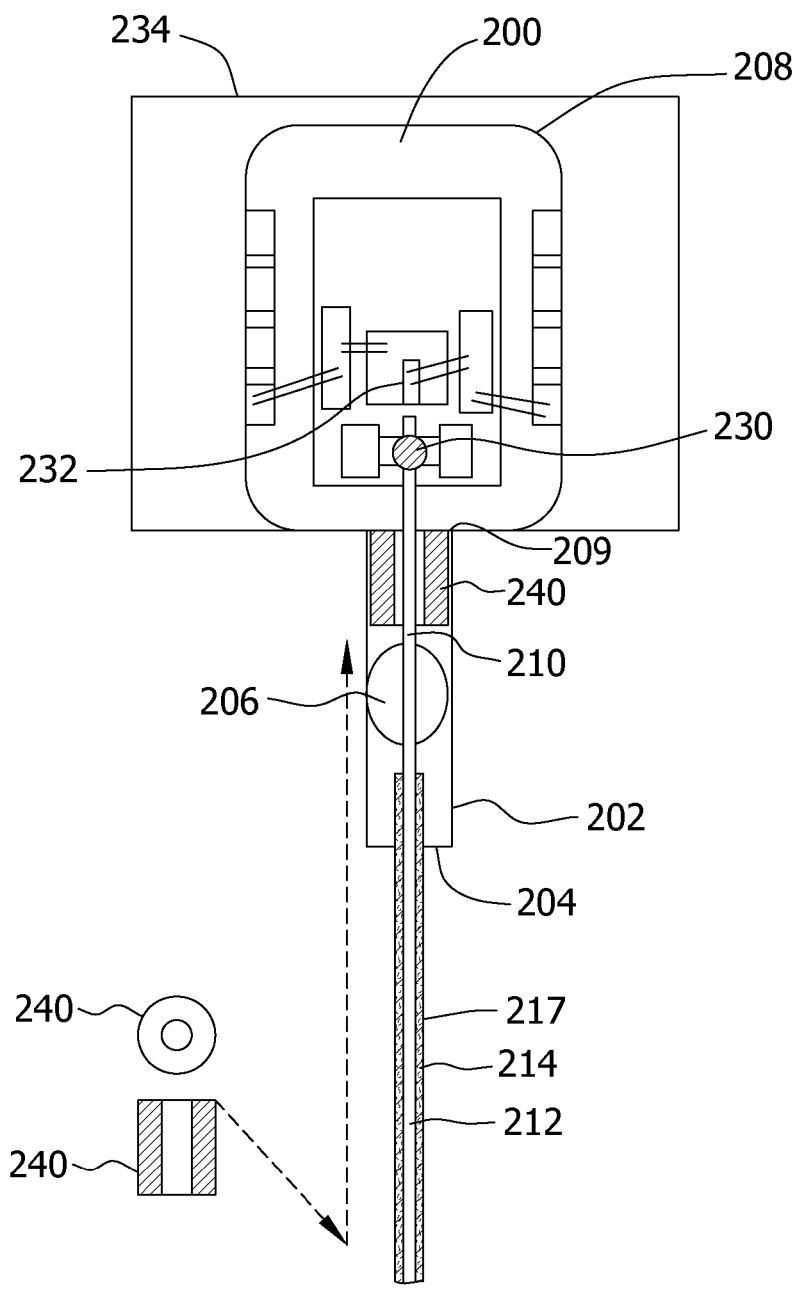
FIG. 18 illustrates insertion of a tube shaped solder preform into the feed through tube of the vertically oriented package shown in FIG. 17.
Figure 19:
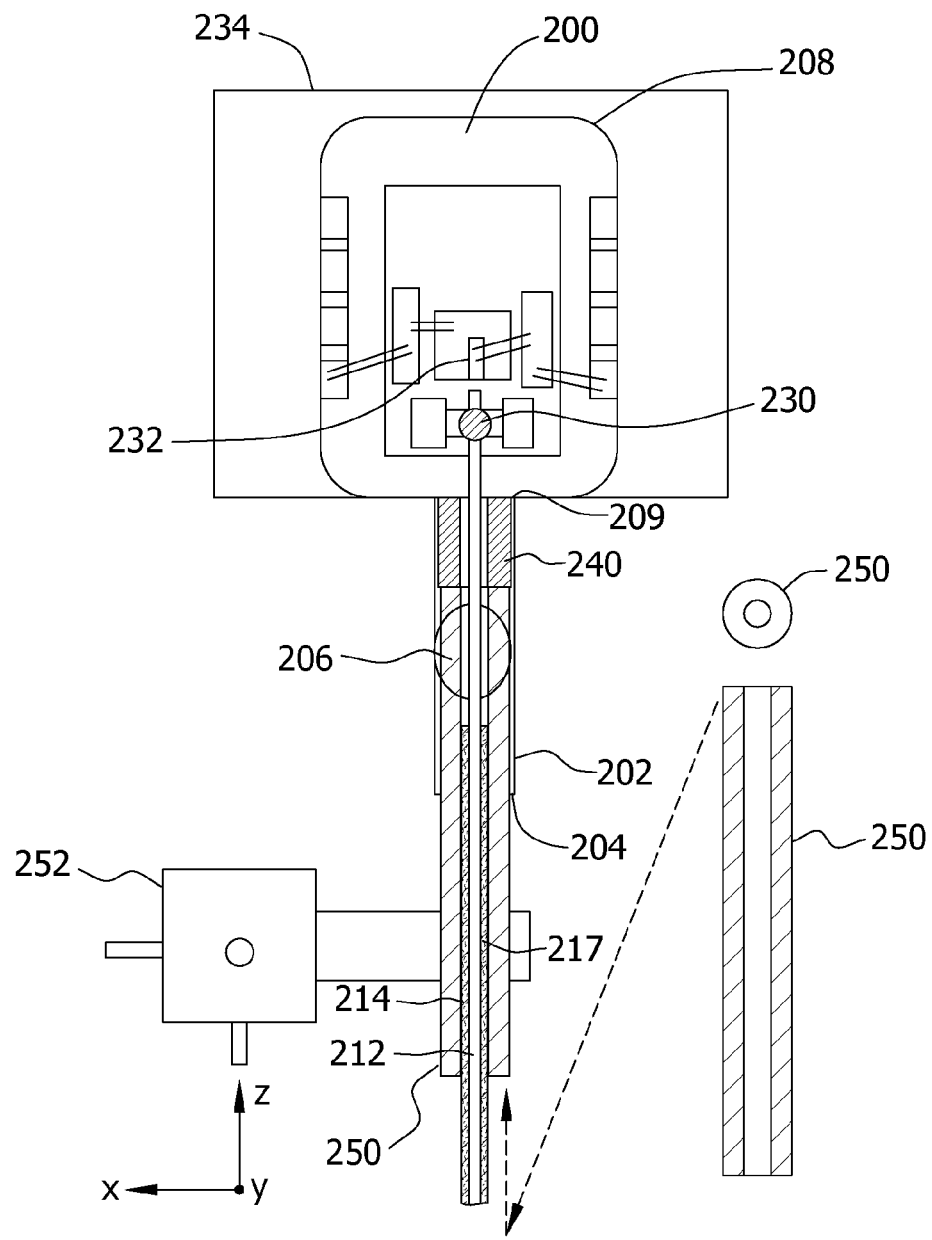
FIG. 19 illustrates insertion of a quartz tube into the feed through tube of the vertically oriented package shown in FIG. 17, where the quartz tube maintains a position of the solder preform of FIG. 18.

Now referring to FIG. 18, a tube shaped solder preform 240 is inserted into the feed through tube 202 as shown. FIG. 19 illustrates the mounting of a quartz tube 250 on an x, y, z micro-manipulator 252. The quartz tube 250 is slid over the coating 217 and the micro manipulator 252 is used to insert the quartz tube 250 into the feed through tube 202. In this embodiment, quartz tube 250 functions as a stopper to prevent the solder preform 240 from falling out of the feed through tube 202. The quartz tube 250 is inserted into the feed through tube 202 using the manipulator 252, until the vertical position of solder preform 240 is finely positioned to slightly protrude into the main body 208 through opening 209. It should be noted that the quartz tube 250 is placed such that at least a portion of the coating 217 is within the quartz tube 250 and also the feed through tube 202.

Figure 20:
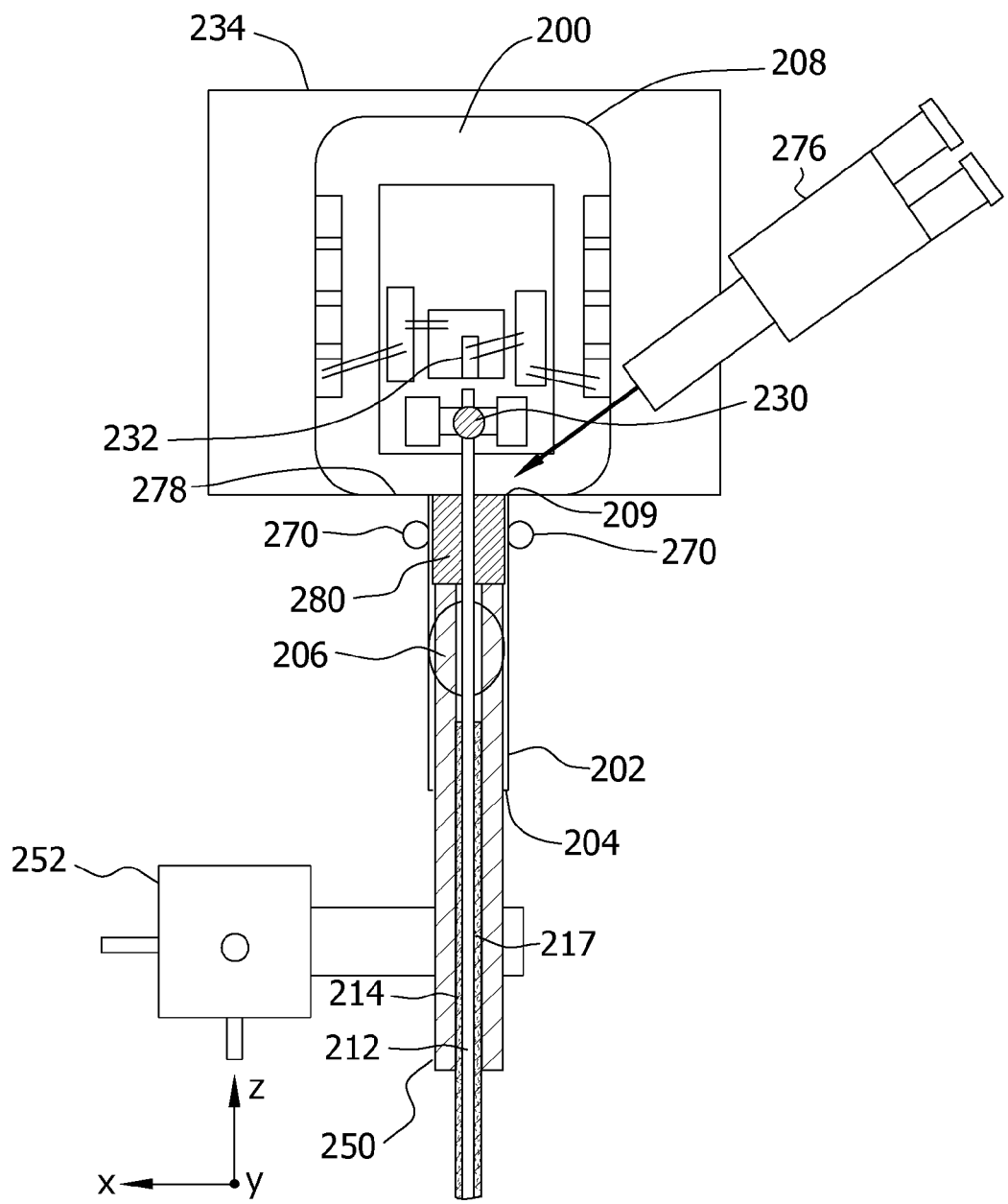
FIG. 20 shows a heating device positioned to clamp on to the feed through tube of the vertically oriented package shown in FIG. 17.

FIG. 20 shows micro-tweezers 270 that are positioned to clamp on to the outside of feed through tube 202. Micro-tweezers 270 are operable to apply heat to feed through tube 202, for example, by activation of a foot switch (not shown in FIG. 20). When heat is applied to the feed through tube 202 through micro-tweezers 270, it causes a reflow of solder preform 240. Upon melting, solder preform 240, is subsequently referred to as solder 280. A microscope 276 may be positioned above the opening 209 of the main body 208 of the package 200 to observe the solder reflow process, use a fine z-direction adjustment of the manipulator 252 to make sure the melted solder 280 is filled uniformly to the wall 278 of the package 200.

Figure 21:
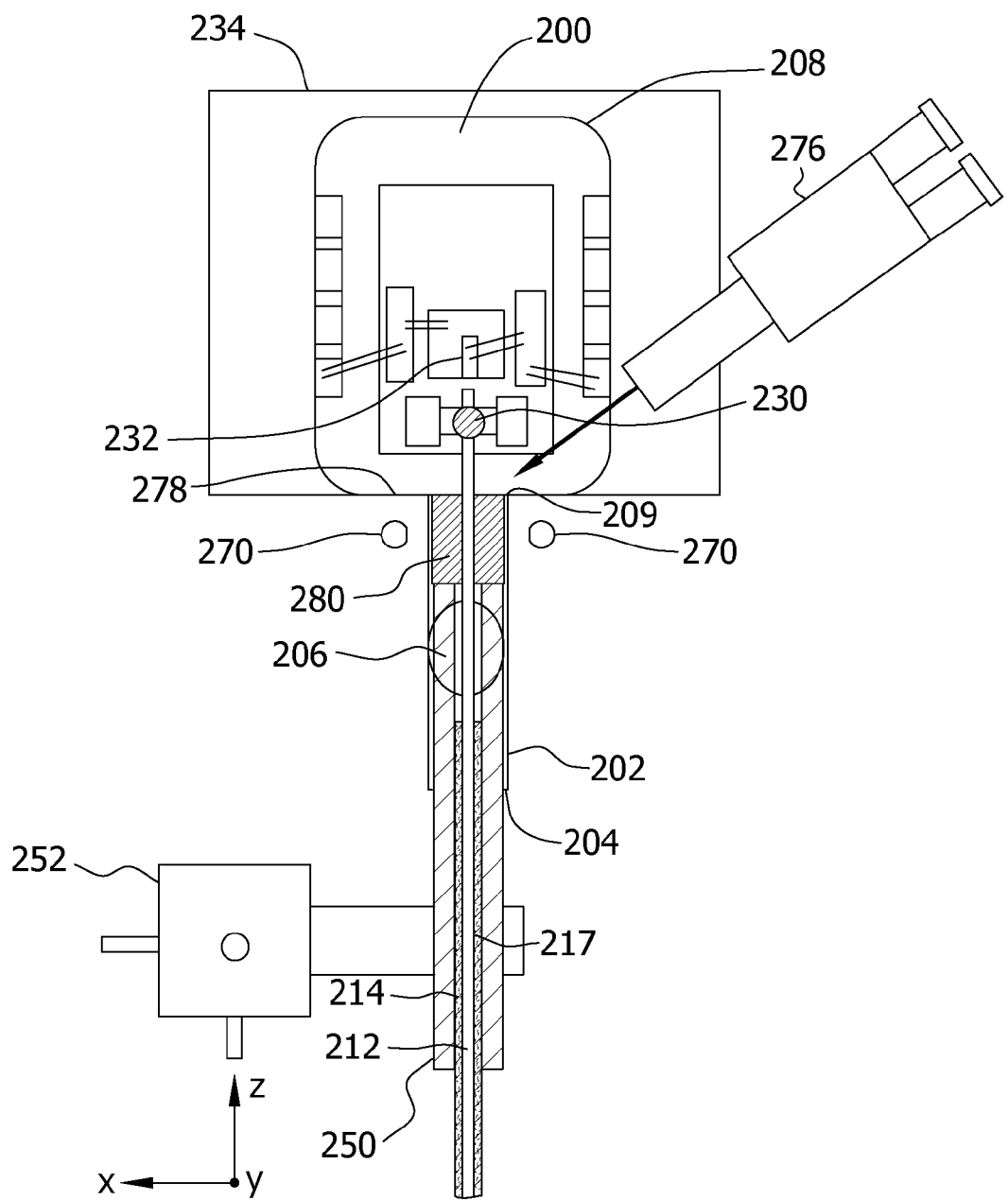
FIG. 21 illustrates removal of the heating device after solder reflow.

As illustrated by FIG. 21, when the reflow of solder 280 is completed, the micro-tweezers 270 are released from the feed through tube 202 to let the package 200 cool down. It is noted that the solder 280 upon reflow has retreated from the main body 208 and is substantially flush with opening 209. After the solder 280 and package 200 have cooled, the package 200 is removed from fixture 234, the quartz tube 250 is removed, and a fiber jacket 216 (not shown) is inserted into the feed through tube 202. The remaining processing for this assembly is the same as that associated with package 100, specifically the insertion of the jacket 216, the epoxy filling and fiber boot insertion processes.

Figure 22:
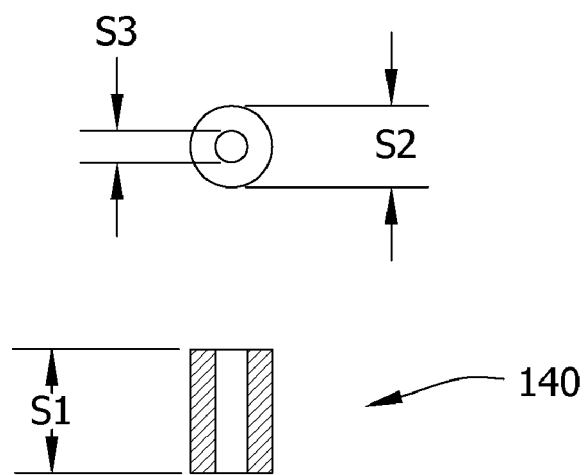
FIG. 22 illustrates the detailed dimensions for one embodiment of solder preform.

FIG. 22 shows the detail dimensions of one embodiment of solder preform 140, which is the same device as solder preform 240. In one preferred embodiment, the dimensions for solder preform 140 is an outer diameter (S2) of about one millimeter, and inner diameter (S3) of about 0.28 millimeter, and a length (S1) of about 3-4 millimeters. As mentioned above, one preferred embodiment for preform 140 is Pb37Sn63 solder. But other dimensions and solder alloy compositions are applicable for the describe processes with different size laser diode packages. One challenge is that tube shaped solder preforms with the dimensions mentioned above have to be made by molding processes and therefore is very expensive. A low cost process is described below.

The following describes one solution for fabricating solder preforms. Commercially available Pb37Sn67 solder wire with a flux core is widely available with an outer diameter of one millimeter with flux core sizes that range from about 0.2 millimeter to about 0.5 millimeter in diameter. Therefore the inner diameter of the flux core solder wire can be selected to closely match the fiber diameter with coating. This flux core solder is then cut it into 3 to 4 mm length pieces and soaked in an ultra-sonic solvent bath for about 15 minutes. The flux core of these solder wire pieces is dissolved by the solvent and becomes substantially clear and hollow, resulting in the solder preforms 140 and 240.

Figure 23:
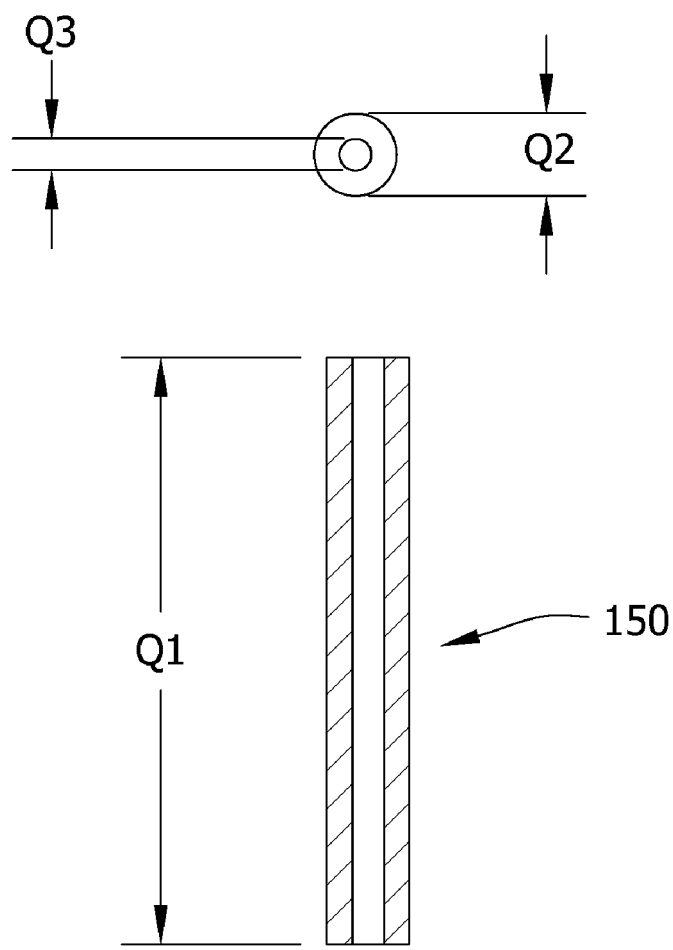
FIG. 23 shows the detail dimensions of one embodiment of quartz tube.

FIG. 23 illustrates the detailed dimensions for one embodiment of quartz tubes 150 and 250. While the following refers only to tube 150, it is equally applicable to tube 250, as they are the same device. As described above, the function of quartz tube 150 is to prevent the solder preform 140 (240) from spreading out too far inside the feed through tube 102, in the case of the horizontal soldering approach, or falling from the feed through tube 202 of the laser diode package 200, in the case of the vertical soldering approach. The tube 150 centers the fiber within the feed through tube 102 during the fiber soldering process. The tube 150 is also used to facilitate the adjustment of the horizontal (or vertical) position of the solder preform 140 (240) inside the feed through tubes 102 (202) by the x, y, z manipulator. Quartz material is used because it has melting temperature about 1670 degrees Celsius, which is much higher than the melting points of all possible solder preforms. Quartz tube 150 also has high compressive strength (>1000 psi), very low coefficient of thermal expansion (CTE<5.5E-7 mm degree Celsius) and is optically transparent. These material characteristics make quartz a suitable material for this application. In one specific application, preferred dimensions of tube 150 are about one millimeter in outer diameter (Q2), about 0.28 millimeter in inner diameter (Q3), and about 4 centimeters in length (Q1). Other dimensions are utilized for other laser diode package form factors. In one embodiment, tube 150 is fabricated using a high precision quartz tube extrusion process. This extrusion process is a mature commercial technology. Therefore, tubes 150 are available in many different high precision dimensions at low cost.

Figure 24:
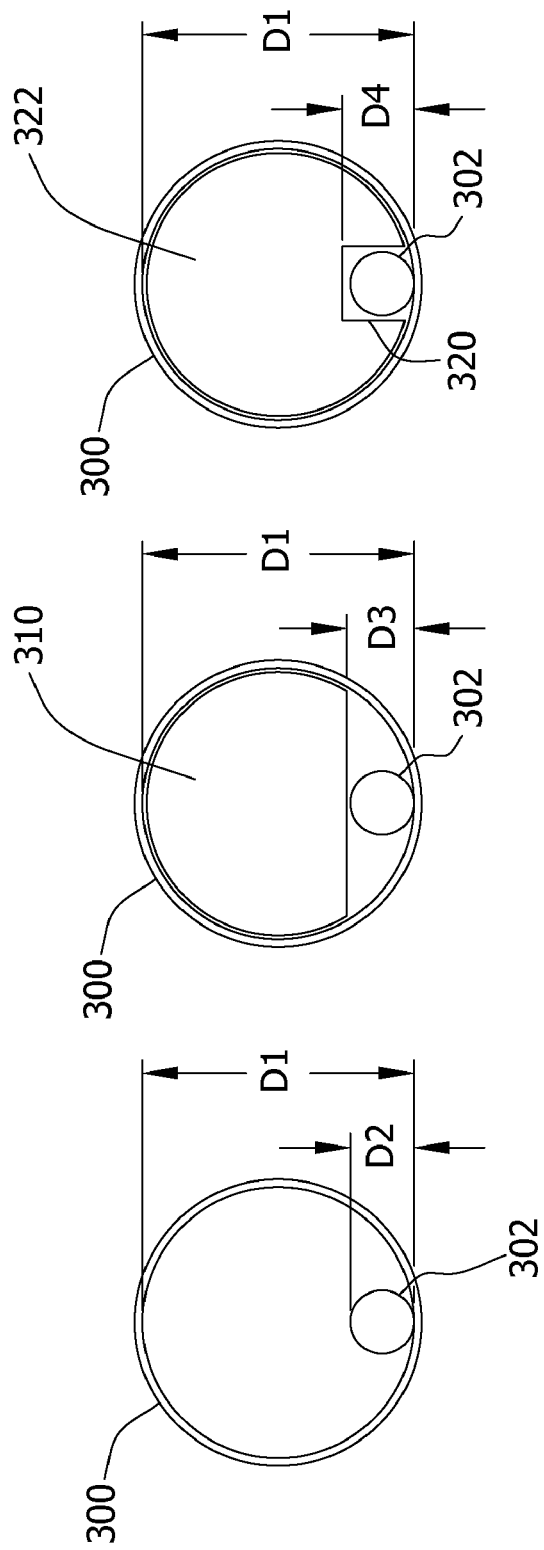
FIG. 24 illustrates a fiber off-center inside the feed through tube and embodiments of a quartz rod utilized to accommodate the off-center fiber situation.

The processes described above assume the fiber is concentric inside the feed through tube. In some production situations, the fiber tends to be positioned off-center inside the feed through tube 300 as shown in FIG. 24(*a*), where the fiber 302, with diameter D2, is placed at the bottom of the tube 300. There are at least two ways a quartz device can be made to accommodate this off-center fiber situation which are illustrated in FIGS. 24(*b*) and 24(*c*). FIG. 24(*b*) shows a solid quartz rod 310 made into D-shape by mechanical grinding and polishing, the "cut-off" part (D3) of the D-shape rod allows it to be fed through the tube 300 with the fiber 302 maintained in position at the bottom of the tube 300. FIG. 24(*c*) illustrates another approach to accommodate the off-center fiber 302 by making a fiber groove 320 along the longitudinal direction of a quartz rod 322. The fiber groove 320 along the solid quartz rod is formed, for example, by a high precision silicon wafer dicing saw. The process starts by wax mounting the quartz rod on a flat substrate, mounting the substrate with the quartz rod on the dicing saw, aligning the saw blade along the longitudinal direction of the quartz rod to cut a groove with an appropriate width and depth (D4). In one example embodiment, D2, D3 and D4 are about 0.28 millimeter.

Figure 25:
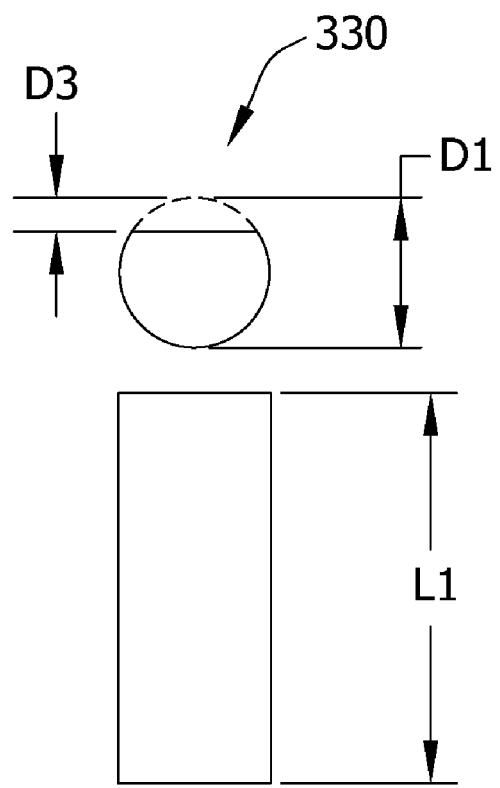
FIG. 25 illustrates an embodiment of a solder preform for utilization with an off-center fiber.

Similarly, and as shown in FIG. 25, the solder preform 330 for an off-center fiber is fabricated to have a D-shape. FIG. 25 shows the dimensions for one embodiment of a D-shape solder preform 330. The D-shape solder preform 330 is formed by mechanically trimming a solid solder rod (or non flux core solid solder wire) to accommodate the off-center fiber in the tube 300 (shown in FIG. 24). In the example embodiment, the diameter D1 of 330 before trimming is about 1 millimeter. The trimming process is accomplished by mechanical grinding with fine sand paper or cutting with a razor blade. Starting with a long solid solder rod (or wire) about four cm in length, the edge is trimmed by about 0.28 mm (D3), and a relatively long D-shaped solder rod is formed. The D-shaped solder rod is then cut into pieces with a length (L1) that is usable as a solder preform. The optimum values of S1 and L1, for one example device, are determined by dimensional analysis as shown in Table 1.

TABLE 1

Dimensional analysis for length of solder preform

|  |  |  | Unit |
|---|---|---|---|
| Metalized fiber diameter | d1 | 132.000 | μm |
| Mini-dil package snout ID (45 mil) | id | 1,150.000 | μm |
| Mini-dil package wall to snout window distance | ds | 2.450 | mm |
| Mini-dil Snout surface area, A1 | A1 = π × [id/2)$^2$ − (d1/2)$^2$] | 1,025,006.690 | μm$^2$ |
| Tube shape solder preform ID | S3 | 300.000 | μm |
| Tube shape solder preform OD (40 mil) | S2 | 1,000.000 | μm |
| Tube shape solder preform surface area, A2 | A2 = π × [(S2/2)$^2$ − (S3/2)$^2$] | 714,691.250 | μm$^2$ |
| Tube shape solder length required, S1 | S1 = (A1 × ds)/A2 | 3,514 | mm |
| D-shape solder preform (un-cut) diameter | D1 | 1,000.000 | μm |
| D-shape solder preform cut-off height | D3 | 280.000 | μm |
| D-shape solder preform surface area, A3 | Derive from ACAD | 605,400.000 | μm$^2$ |
| D-shape solder length required, L1 | L1 = (A1 × ds)/A3 | 4.148 | mm |

Figure 26:
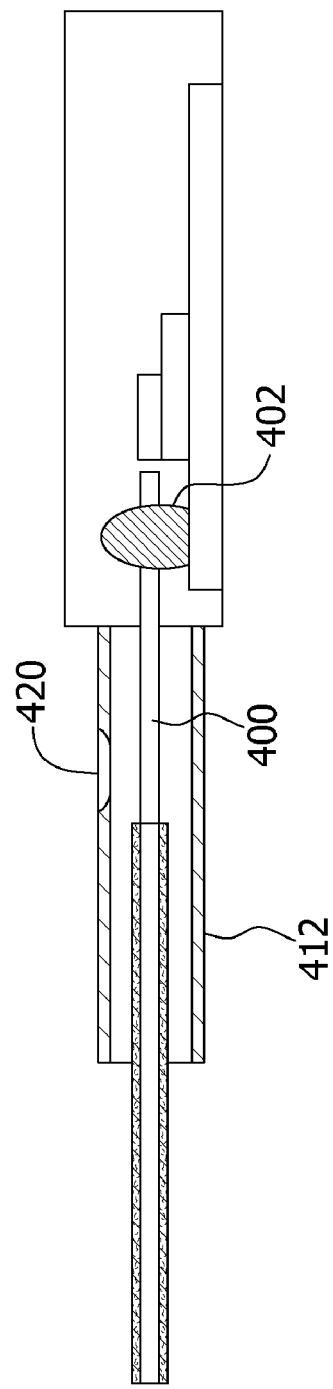
FIG. 26 is an illustration of an optical fiber attachment in which a solder preform is not inserted into a feed through tube of a laser package.
Figure 27:
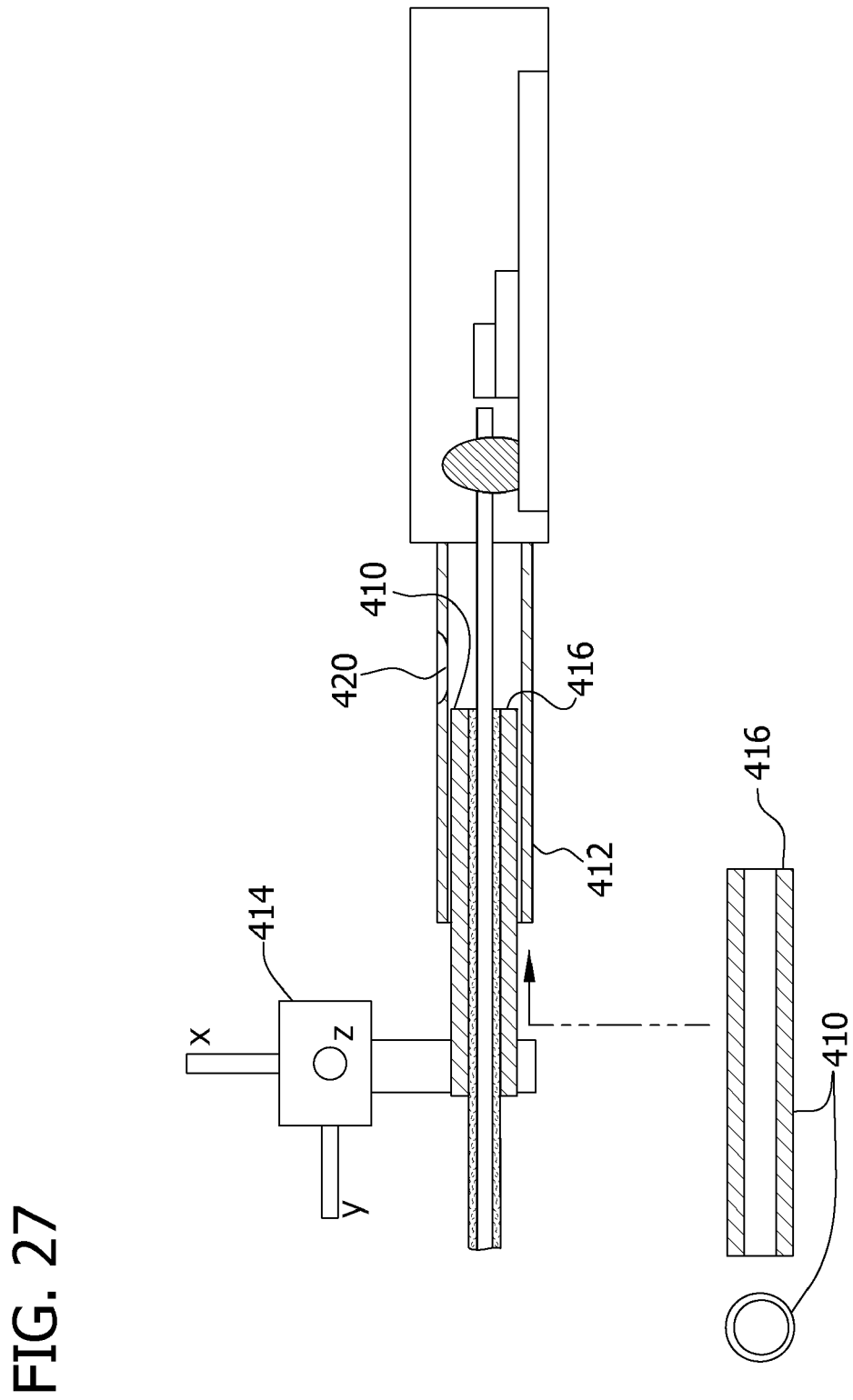
FIG. 27 illustrates insertion of a quartz tube into the feed through tube of FIG. 26.
Figure 28:
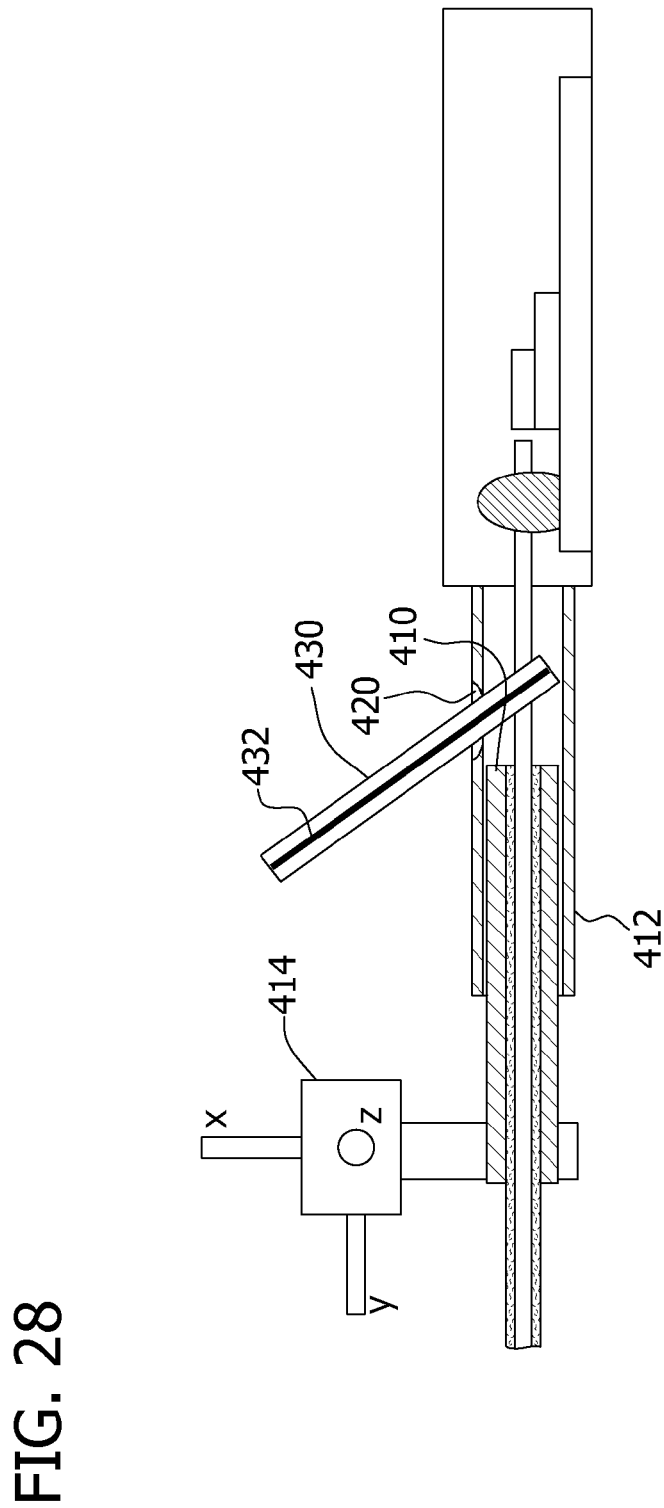
FIG. 28 illustrates insertion of solder wire through the window of the feed through tube shown in FIG. 26.
Figure 29:
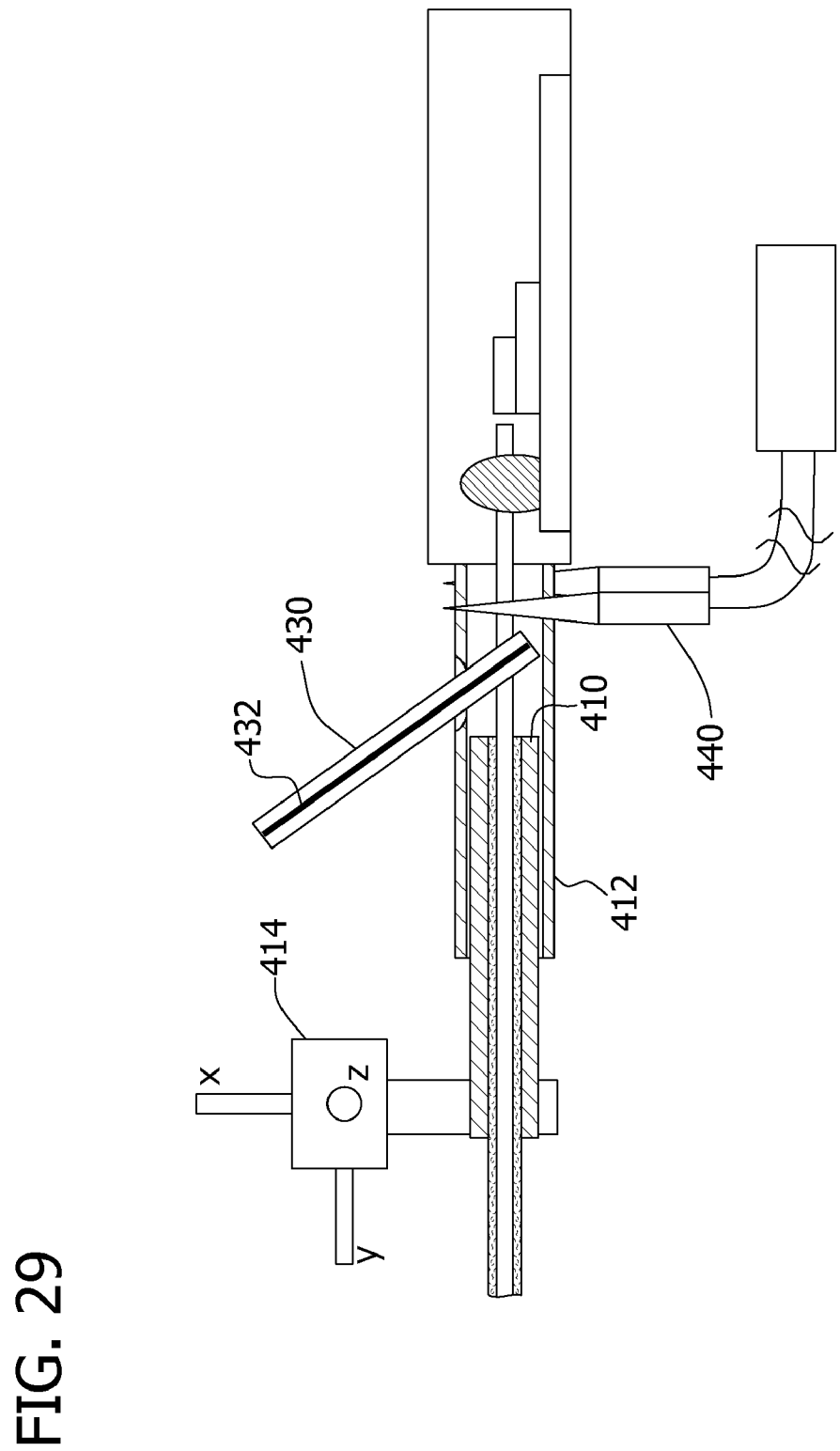
FIG. 29 illustrates a heating device positioned to clamp onto the feed through tube.
Figure 30:
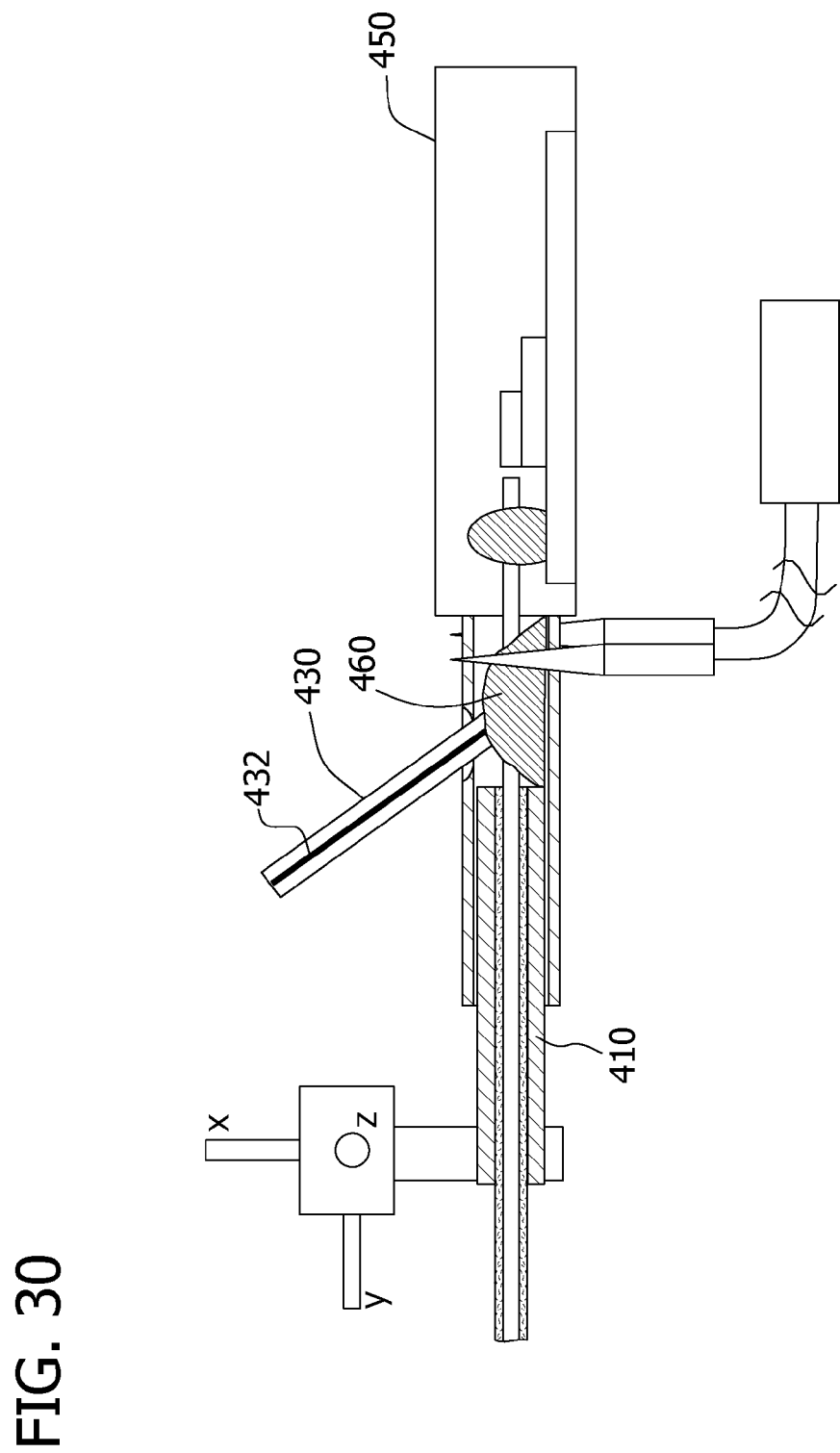
FIG. 30 illustrates a portion of the solder wire melting and spreading in the region between the quartz tube and an opening in the laser package of FIG. 26.

An alternative embodiment for attaching and ruggedizing an optical fiber utilizing feed through tube is shown in FIG. 26. In this embodiment, a solder preform is not utilized. Alignment of fiber 400 and locking of fiber 400 with solder 402 is the same as described above. As shown in FIG. 27, a quartz tube 410 is inserted as described above into a feed through tube 412 using the x, y, z micro-manipulator 414. Insertion of quartz tube 410 is halted at location where a leading edge 416 of quartz tube 410 is near the window 420 of tube 412. Now referring to FIG. 28, a solder wire 430, preferably having a core of flux 432 is inserted through window 420. Micro-tweezers 440 are positioned to clamp onto feed through tube 412 as shown in FIG. 29. Heat is applied as described previously, and a portion of the solder wire 430 melts and spreads in the region between the quartz tube 410 and the opening in package 450 as shown in FIG. 30. The quartz tube 410 is used to compress the melted solder 460, and the remaining steps to complete the fiber optic assembly are the same as those described previously. The advantage of this approach is the flexibility of not having to use a solder preform with a specific shape and geometry. There is also no need to dispense solder flux since the approach utilizes flux core solder, simplifying the fiber soldering process.

If flux core solder wire is not available, solder flux can be dispensed into the soldering area before the non-flux solder wire is inserted for melting. After positioning of quartz tube 410, a solder flux dispenser can be used to drop a small amount of solder flux into the window 420. After this step the solder wire is inserted and heated as described in the preceding paragraph.

Figure 31:
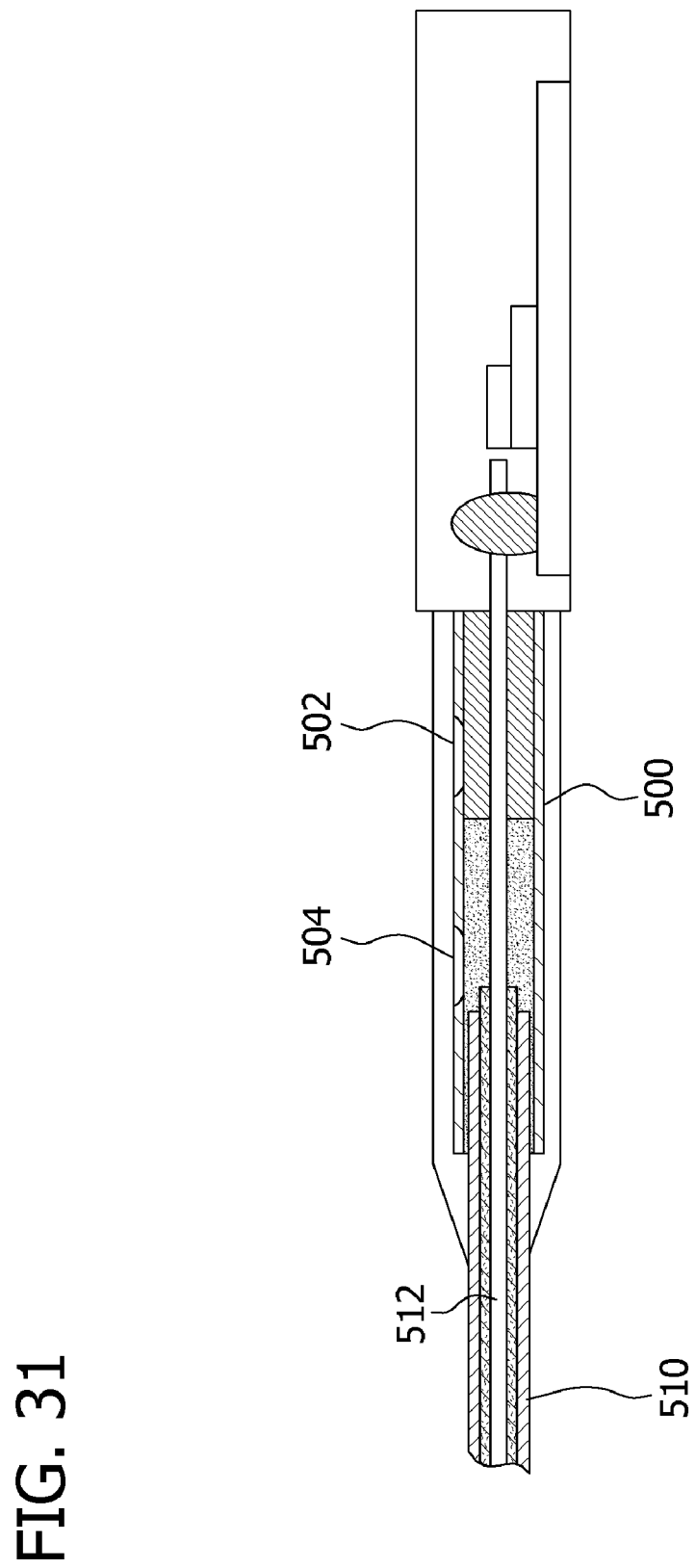
FIG. 31 illustrates an embodiment of a laser package having a feed through tube that includes one window formed therein for soldering and another window formed therein for application of epoxy to the jacket associated with the optical fiber 512.

Another embodiment is illustrated in FIG. 31. In this embodiment the feed through tube 500 includes a first window 502 formed therein for soldering and a second window 504 formed therein for epoxying the jacket 510 surrounding the fiber 512. This approach incorporates a slightly longer tube 500 than the tubes described in previously explained embodiments. The basic processing steps for soldering and epoxying the fiber is the same as explained above, but the epoxy will be deposited via the separate window 504 on the feed through tube 500. Other solder heating techniques, such as RF induction heating or high power laser heating to replace the micro-tweezers heating is also applicable to the set up and processes described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for providing an improved interconnection between an optical fiber and an optical package, the optical package including a feed through tube extending from a main body, the main body configured to contain at least one optical component, said method comprising:
    inserting an end of the fiber through the feed through tube and into the main body of the optical package, a portion of the fiber proximate the end being metalized;
    attaching the metalized portion of the fiber proximate an optical component within the main body of the optical package, a portion of the metalized fiber remaining within the feed through tube;
    inserting a stopping device into the feed through tube;
    melting solder within the feed through tube, in an area between the stopping device and the main body of the optical device, the area containing metalized fiber;
    compressing the melted solder using the stopping device;
    removing the stopping device from the feed through tube after the solder has solidified; and
    attaching a jacket associated with the optical fiber within the feed through tube.

2. The method according to claim 1 wherein inserting a stopping device into the feed through tube comprises sliding a quartz tube into the feed through tube.

3. The method according to claim 1 wherein melting solder within the feed through tube further comprises inserting a solder preform into the feed through tube.

4. The method according to claim 1 further comprising:
    selecting a flux core solder wire with an inner diameter that is proximate the diameter of the fiber;
    cutting the solder wire into preform lengths; and
    exposing the cut solder wire to a solvent to remove the flux core.

5. The method according to claim 1 wherein melting solder within the feed through tube further comprises:
    inserting solder into the feed through tube through a window formed in the feed through tube; and
    applying heat to the feed through tube to melt the solder.

6. The method according to claim 1 wherein attaching a jacket associated with the optical fiber comprises applying an adhesive into the feed through tube, between the jacket and the compressed solder, through a window formed in the feed through tube.

7. The method according to claim 6 further comprising causing a portion of the adhesive to extend into a space between an inner diameter of the feed through tube and an outer diameter of the fiber jacket.

8. The method according to claim 1 wherein melting solder within the feed through tube comprises applying heat to the feed through tube.

9. The method according to claim 1 wherein compressing the melted solder using the stopping device comprises compressing the melted solder between the stopping device and the main body of the optical package.

10. The method according to claim 1 further comprising:
    sliding a boot over the jacket and feed through tube; and
    attaching the boot to the jacket and the feed through tube using an adhesive.

11. The method according to claim 1 wherein inserting a stopping device into the feed through tube comprises maintaining a position of a solder preform within the feed through tube proximate the main body.

12. The method according to claim 1 further comprising shaping a cross section of the stopping device based on an orientation of the fiber within the feed through tube.

13. The method according to claim 1 further comprising shaping a cross section of a solder preform based on an orientation of the fiber within the feed through tube.

14. The method according to claim 1 wherein:
    melting solder within the feed through tube comprises inserting solder into the feed through tube through a first window formed in the feed through tube; and
    attaching a jacket associated with the optical fiber comprises inserting an adhesive into the feed through tube, between the jacket and the compressed solder, through a second window formed in the feed through tube.

15. An optical device, comprising:
    an optical fiber comprising a first end having a length, the length comprising a metalized portion of said optical fiber;
    an optical fiber jacket;
    a main body for placement of an optical component therein;
    a hollow feed through tube extending from said main body, said hollow feed through tube comprising a window formed in a side thereof, wherein:
        a first section of said metalized portion extends through said feed through tube into said main body;
        a second section of said metalized portion soldered within the feed through tube, between said window and said main body, wherein the second section of said metalized portion is soldered within said feed through tube by compressing the solder against said main body using a stopping device placed within said feed through tube; and
        said optical fiber jacket placed over said optical fiber, an end portion of said optical fiber jacket within said feed through tube, said end portion maintained within said feed through tube via application of an adhesive through said window.

16. The optical device according to claim 15 wherein the second section of said metalized portion is soldered within said feed through tube by feeding solder through said window of said feed through tube.

17. The optical device according to claim 15 wherein to solder the second section of said metalized portion within said feed through tube, a solder preform is placed within said feed through tube between said main body and a stopping device.

18. The optical device according to claim 15 wherein the length comprises a coated portion of said optical fiber, said end portion of said optical fiber jacket within said feed through tube and about said coated portion of said optical fiber.

19. A method for providing strain relief to an optical fiber connected to an optical device, said method comprising:
   soldering a metalized portion of the fiber within a feed through tube, the feed through tube extending from the optical device, the soldering comprising:
      inserting a stopping device within the feed through tube;
      melting solder within the feed through tube, the solder placed between the stopping device and the optical device;
      compressing the melted solder using the stopping device; and
      removing the stopping device after the melted solder has solidified;
   sliding a portion of an optical fiber jacket into the feed through tube; and
   applying an adhesive through a window formed in a side of the feed through tube to bond the optical fiber jacket to an inside of the feed through tube.

20. The method according to claim 19 wherein melting solder within the feed through tube comprises:
   at least one of inserting a solder preform into the feed through tube prior to insertion of the stopping device and inserting solder into the feed through tube through a window formed in a side of the feed through tube; and
   applying heat to the feed through tube.

21. The method according to claim 19 wherein:
   melting solder within the feed through tube comprises inserting solder into the feed through tube through a first window formed in the feed through tube; and
   applying an adhesive through a window formed in a side of the feed through tube comprises inserting an adhesive into the feed through tube through a second window formed in the feed through tube.

* * * * *

UNITED STATES PATENT AND TRADEMARK OFFICE
CERTIFICATE OF CORRECTION

PATENT NO.        : 8,215,848 B1
APPLICATION NO.   : 12/464585
DATED             : July 10, 2012
INVENTOR(S)       : Chan et al.

It is certified that error appears in the above-identified patent and that said Letters Patent is hereby corrected as shown below:

Title Page, Item (75) Inventors, delete "Dennis G. Koshniz" and insert therefor
-- Dennis G. Koshinz --.

Signed and Sealed this
Fourth Day of December, 2012

David J. Kappos
*Director of the United States Patent and Trademark Office*